(12) United States Patent
Agrawal et al.

(10) Patent No.: US 11,559,772 B2
(45) Date of Patent: Jan. 24, 2023

(54) GRAPHENE MEMBRANE FILTER FOR GAS SEPARATION

(71) Applicant: GAZNAT SA, Lausanne (CH)

(72) Inventors: Kumar Varoon Agrawal, Vevey (CH); Shiqi Huang, Sion (CH)

(73) Assignee: GAZNAT SA, Lausanne (CH)

( * ) Notice: Subject to any disclaimer, the term of this patent is extended or adjusted under 35 U.S.C. 154(b) by 249 days.

(21) Appl. No.: 16/979,895

(22) PCT Filed: Mar. 12, 2019

(86) PCT No.: PCT/EP2019/056144
§ 371 (c)(1),
(2) Date: Sep. 11, 2020

(87) PCT Pub. No.: WO2019/175162
PCT Pub. Date: Sep. 19, 2019

(65) Prior Publication Data
US 2021/0023508 A1 Jan. 28, 2021

(30) Foreign Application Priority Data
Mar. 13, 2018 (EP) .................................... 18161632

(51) Int. Cl.
*B01D 53/22* (2006.01)
*B01D 71/02* (2006.01)
(Continued)

(52) U.S. Cl.
CPC ......... *B01D 71/021* (2013.01); *B01D 53/228* (2013.01); *B01D 67/0067* (2013.01);
(Continued)

(58) Field of Classification Search
CPC ............ B01D 67/0093; B01D 2325/04; B01D 2325/20; B01D 2323/283;
(Continued)

(56) References Cited

U.S. PATENT DOCUMENTS 10,593,932 B2 * 3/2020 Zhamu ................ H01M 4/0416
2013/0062104 A1 3/2013 Craighead et al.
(Continued)

FOREIGN PATENT DOCUMENTS

CN 103 663 444 12/2015
CN 104 495 806 1/2017
(Continued)

OTHER PUBLICATIONS

Chen Machine translation of CN 108745003 A (Year: 2018).*
(Continued)

*Primary Examiner* — Anthony R Shumate
(74) *Attorney, Agent, or Firm* — Saliwanchik, Lloyd & Eisenschenk

(57) ABSTRACT

The invention relates to carbon supported crack- and tear-free graphene membranes of large area useful for selective gas separation, method of preparation and uses thereof. In particular, the invention relates to carbon supported crack- and tear-free graphene membranes having good gas separation performance, in particular high $H_2$ permeance and $H_2/CH_4$ selectivities.

20 Claims, 14 Drawing Sheets

(51) Int. Cl.
  B01D 67/00 (2006.01)
  B01D 69/02 (2006.01)
  B01D 69/12 (2006.01)
(52) U.S. Cl.
  CPC ......... *B01D 67/0093* (2013.01); *B01D 69/02* (2013.01); *B01D 69/12* (2013.01); *B01D 2256/16* (2013.01); *B01D 2256/245* (2013.01); *B01D 2257/504* (2013.01); *B01D 2323/18* (2013.01); *B01D 2323/283* (2013.01); *B01D 2325/02* (2013.01); *B01D 2325/04* (2013.01); *B01D 2325/20* (2013.01)
(58) Field of Classification Search
  CPC .......... B01D 2256/245; B01D 2325/02; B01D 67/0067; B01D 71/021; B01D 2323/18; B01D 2257/504; B01D 53/228; B01D 69/12; B01D 2256/16; B01D 69/02
  See application file for complete search history.

(56) References Cited

U.S. PATENT DOCUMENTS

| | | | | |
|---|---|---|---|---|
| 2015/0321147 | A1* | 11/2015 | Fleming | B32B 37/0084 156/60 |
| 2015/0368811 | A1* | 12/2015 | Gray | C25B 1/04 204/290.01 |
| 2015/0376019 | A1* | 12/2015 | Tsapatsis | C01B 33/12 423/335 |
| 2018/0103694 | A1* | 4/2018 | Fortenbacher | A41D 13/0051 |
| 2018/0154316 | A1* | 6/2018 | Nair | B01D 67/0041 |
| 2019/0389744 | A1* | 12/2019 | Biris | B01J 20/3204 |
| 2020/0227725 | A1* | 7/2020 | Joo | H01M 4/131 |
| 2020/0323043 | A1* | 10/2020 | Fortenbacher | B32B 15/082 |
| 2021/0036312 | A1* | 2/2021 | Lanning | H01M 4/622 |
| 2021/0126246 | A1* | 4/2021 | Gazda | H01M 4/587 |
| 2021/0332489 | A1* | 10/2021 | Claussen | C01B 32/205 |
| 2022/0184557 | A1* | 6/2022 | Jang | B01D 63/06 |

FOREIGN PATENT DOCUMENTS

| | | |
|---|---|---|
| CN | 108745003 A * | 11/2018 |
| WO | WO 2013/138698 | 9/2013 |
| WO | WO 2016/189320 | 12/2016 |

OTHER PUBLICATIONS

Agrawal, K. V et al. "Fabrication, Pressure Testing, and Nanopore Formation of Single-Layer Graphene Membranes" *J. Phys. Chem. C*, 2017, pp. 14312-14321, vol. 121.
Blankenburg, S. et al. "Porous Graphene as an Atmospheric Nanofilter" *Small*, 2010, pp. 2266-2271, vol. 6, No. 20.
Cancado, L. G. et al. "Quantifying Defects in Graphene via Raman Spectroscopy at Different Excitation Energies" *Nano Letters*, 2011, pp. 3190-3196, vol. 11.
Celebi, K. et al. "Ultimate Permeation Across Atomically Thin Porous Graphene" *Science*, Apr. 18, 2014, pp. 289-292, vol. 344.
Drahushuk, L. W. et al. "Mechanisms of Gas Permeation through Single Layer Graphene Membranes" *Langmuir*, 2012, pp. 16671-16678, vol. 28.
Du, H. et al. "Separation of Hydrogen and Nitrogen Gases with Porous Graphene Membrane" *J. Phys. Chem. C*, 2011, pp. 23261-23266, vol. 115.
He, G. et al. "High-permeance polymer-functionalized single-layer graphene membranes that surpass the postcombustion carbon capture target" *Energy Environ. Sci.*, 2019, pp. 3305-3312, vol. 12.
He, G. et al. "Synergistic $CO_2$-Sieving from Polymer with Intrinsic Microporosity Masking Nanoporous Single-Layer Graphene" *Adv. Funct. Mater.*, 2020, pp. 1-14.
Huang, S. et al. "Single-layer graphene membranes by crack-free transfer for gas mixture separation" *Nature Communications*, 2018, pp. 1-11, vol. 9, No. 2632.
Jackson, E. A. et al. "Nanoporous Membranes Derived from Block Copolymers: From Drug Delivery to Water Filtration" *ACS Nano*, 2010, pp. 3548-3553, vol. 4, No. 7.
Jiang, D. et al. "Porous Graphene as the Ultimate Membrane for Gas Separation" *Nano Letters*, 2009, pp. 4019-4024, vol. 9, No. 12.
Khan, M. H. et al. "Hydrogen sieving from intrinsic defects of benzene-derived single-layer graphene" *Carbon*, 2019, pp. 458-466, vol. 153.
Koenig, S. P. et al. "Selective molecular sieving through porous graphene" *Nature Nanotechnology*, 2012, pp. 728-732, vol. 7.
Lee, C.-K. et al. "Monatomic Chemical-Vapor-Deposited Graphene Membranes Bridge a Half-Millimeter-Scale Gap" *ACS Nano*, 2014, pp. 2336-2344, vol. 8, No. 3.
Li, H. et al. "Ultrathin, Molecular-Sieving Graphene Oxide Membranes for Selective Hydrogen Separation" *Science*, Oct. 4, 2013, pp. 95-98, vol. 342.
Liu, H. et al. "Permeance of $H_2$ through porous graphene from molecular dynamics" *Solid State Communications*, 2013, pp. 101-105, vol. 175-176.
Meyer, J. C. et al. "The structure of suspended graphene sheets" *Nature*, Mar. 1, 2007, pp. 60-63, vol. 446.
Polsen, E. S. et al. "High-speed roll-to-roll manufacturing of graphene using a concentric tube CVD reactor" *Scientific Reports*, May 2015, pp. 1-12, vol. 5, No. 10257.
Rezaei, M. et al. "Hydrogen-sieving single-layer graphene membranes obtained by crystallographic and morphological optimization of catalytic copper foil" *Journal of Membrane Science*, 2020, pp. 1-10, vol. 612.
Robeson, L. M. "The upper bound revisited" *Journal of Membrane Science*, 2008, pp. 390-400, vol. 320.
Rodriguez, A. T. et al. "Facile Synthesis of Nanostructured Carbon through Self-Assembly between Block Copolymers and Carbohydrates" *Adv. Fund. Mater.*, 2007, pp. 2710-2716, vol. 17.
Suk, J. W. et al. "Transfer of CVD-Grown Monolayer Graphene onto Arbitrary Substrates" *ACS Nano*, 2011, pp. 6916-6924, vol. 5, No. 9.
Wang, L. et al. "Fundamental transport mechanisms, fabrication and potential applications of nanoporous atomically thin membranes" *Nature Nanotechnology*, Jun. 2017, pp. 509-522, vol. 12.
Yang, Y. et al. "Large-area graphene-nanomesh/carbon-nanotube hybrid membranes for ionic and molecular nanofiltration" *Science*, Jun. 14, 2019, pp. 1-6, vol. 364.
Yoo, S. et al. "Hierarchical multiscale hyperporous block copolymer membranes via tunable dual-phase separation" *Sci. Adv.*, Jul. 24, 2015, pp. 1-7, vol. 1, e1500101.
Yuan, J. et al. "Tuning the Electrical and Optical Properties of Graphene by Ozone Treatment for Patterning Monolithic Transparent Electrodes" *ACS Nano*, 2013, pp. 4233-4241, vol. 7, No. 5.
Zhang, J. et al. "Clean Transfer of Large Graphene Single Crystals for High-Intactness Suspended Membranes and Liquid Cells" *Adv. Mater.*, 2017, pp. 1-7, vol. 29.
Zhao, J. et al. "Etching gas-sieving nanopores in single-layer graphene with an angstrom precision for high-performance gas mixture separation" *Sci. Adv.*, Jan. 25, 2019, pp. 1-9, vol. 5.
Written Opinion in International Application No. PCT/EP2019/056144, dated Jun. 24, 2019, pp. 1-11.

* cited by examiner

GRAPHENE MEMBRANE FILTER FOR GAS SEPARATION

CROSS-REFERENCE TO RELATED APPLICATION

This application is the U.S. national stage application of International Patent Application No. PCT/EP2019/056144, filed Mar. 12, 2019.

FIELD OF THE INVENTION

The present invention pertains generally to the field of gas selective separation filters, in particular useful for gas mixture separation, notably in the context of carbon capture resulting from the separation of $H_2$ and $N_2$ from $CO_2$ and hydrocarbons, for instance from gas waste or effluents. The invention more specifically relates to filters using atom-thick graphene porous membranes.

BACKGROUND OF THE INVENTION

In the frame of addressing the global warming issues and identified contributing factors, one option that has been developed is the reduction of greenhouse gas emissions by the capture of carbon dioxide from gaseous streams followed by underground sequestration. Carbon capture and storage is a strategy for mitigating $CO_2$ emissions from large point sources, such as coal-fired power plants. Further, effective separation of $CO_2/CH_4$ is also necessary for biogas processing which mainly contain about 60 vol. % $CH_4$ and 40 vol. % $CO_2$ and large scale $H_2$ processing needs cost effective and efficient means to separate it from other less desirable species, notably $CO_2$. Polymeric membranes have been applied in industrial gas separation for decades and gas-selective have been commercialized for various gas separation (Sanders et al., 2013, *Polymer.*, 54, 4729-4761) but they face performance limitations due to an inherent selectivity performance trade-off (Park et al., 2017, *Science* 356) and physical ageing, mainly involving plasticization of the polymer films overtime of gas passage which affects the filtration free volume (Sanders et al., 2013, supra?).

Atom-thick graphene film hosting molecular selective nanopores is the thinnest possible molecular barrier, and therefore can be regarded as the ultimate membrane for the molecular separation. Several molecular simulations have shown that the two-dimensional nanopores in graphene can yield unprecedented gas permeance, orders of magnitude higher than that attainable with the conventional membranes (Blankenburg et al., 2010, *Small* 6, 2266-2271; Du et al., 2011, *J. Phys. Chem. C*, 115, 23261-23266; Liu et al., 2013, *Solid State Commun.*, 175-176, 101-105). Such high-flux membranes can substantially decrease the membrane area needed for separating a volume of gas mixture, providing a new solution to the problem of membrane scale-up, a longstanding challenge in the field. Therefore, the chemical robustness and the high mechanical strength of the graphene lattice, even with porosity as high as 5% and makes it highly attractive for the gas separation. Recently, several etching methods for drilling sub-nanometer pores in graphene have been developed leading to promising sieving performances for liquids and dissolved ions. However, demonstration of gas sieving ability has been limited. The only concrete evidence was provided by measuring deflation rate of a bilayer graphene micro-balloon, where pores were created on the micromechanically exfoliated graphene by UV treatment (Koenig et al., 2012, *Nat. Nanotechnol.*, 7, 728-32). In general, most of the liquid, ion and gas transport studies have been carried out on micron-sized graphene domains, attributing to the limitations of the micromechanical exfoliation and generation of tears and cracks during transfer of chemical vapor deposition (CVD) derived graphene.

In fact, CVD derived single-layer graphene has been considered as particularly adapted for the fabrication of large-area membranes attributed to the scalability of the CVD process (Polsen et al., 2015, *Sci. Rep.* 5, 10257). However, post-CVD, one needs to transfer graphene from the non-porous catalytic metal foil (e.g. Cu) to a porous substrate for the fabrication of a membrane and conventional transfer methods invariably introduce cracks and tears in the graphene film, and therefore, so far the suspended, crack- and tear-free, single-layer graphene membranes have been limited the membrane area of a few μm (Suk et al., 2011, *ACS Nano*, 5, 6916-6924). Among several transfer techniques developed so far, the wet-transfer technique has been investigated the most due to its versatility allowing graphene transfer on a wide-range of support (Zhang et al., 2017, *Adv. Mater.* 29, 1-7). Briefly, the graphene film is coated with a mechanically reinforcing polymer layer such as a 100-200 nm thick poly(methyl methacrylate) (PMMA) film. Subsequently, the metal foil is etched in an etchant bath leaving the polymer coated graphene floating on the bath. Finally, the floating film is scooped on top of the desired substrate, and the polymer film is dissolved away to expose the surface of graphene. However, significant cracks and tear develop in the graphene film when a porous support is used, primarily because of a strong capillary force on the suspended graphene film during the solvent drying stage (Lee et al., 2014, *ACS Nano*, 8, 2336-2344).

Celebi et al. 2014, *Science*, 344, 289-292 reported a 2'500 $\mu m^2$ film obtained by over-coating a graphene layer by another graphene layer (double layer graphene membrane) for masking cracks in the individual layers. Using focused-ion beam (FIB), they drilled relatively large pores in graphene (>7.6 nm) and observed effusive gas transport for this perforated double-layer graphene membrane. The effusive transport led to gas selectivities expected from the Knudsen diffusion ($H_2/CO_2$ selectivity up to 4) and gigantic $H_2$ permeance (ca. $10^{-2}$ mol $m^{-2}$ $s^{-1}$ $Pa^{-1}$). Recently, Boutilier et al., 2017, *ACS Nano*, 11, 5726-5736 have reported the fabrication of a centimeter-scale single-layer nanoporous graphene with a combination of ion-bombardment and $O_2$ plasma. However, the presence of cracks generated during transfer in the graphene film limited the separation selectivity close to that expected from the Knudsen diffusion ($He/SF_6$ and $H_2/CH_4$ separation selectivities of 8 and 3.2, respectively). Nonetheless, using transport modeling, they demonstrated presence of molecular sieving nanopores in their film, which are highly attractive for gas separation. Graphene oxide (GO) films have been successfully used for $H_2/CO_2$ separation (Li et al, 2013, *Science*, 342, 95-8) with a modest $H_2$ permeance ($10^{-7}$ mol $m^{-2}$ $s^{-1}$ $Pa^{-1}$). However, the reproducible synthesis and stability of GO membranes is questionable due to the difficulty in predicting the precise structure of the GO flakes and unstable angling bonds in the GO lattice. Overall, the demonstration of gas mixture separation from sufficiently-scaled single-layer graphene membranes has remained elusive, as it necessitates development of methods to a) transfer large-area graphene onto porous supports without generating cracks and tears, and b) generate narrow pore-size-distribution in graphene (PSD) (Wang et al., 2017, *Nat. Nanotechnol.*, 12, 509-522).

Therefore, the development of new methods of fabricating crack- and tear-free suspended graphene films that possess size-selective pores with a narrow pore-size-distribution is highly attractive in view of the large-scale deployment of the nanoporous two-dimensional membranes that has been hampered so far by the above described technical limitations.

SUMMARY OF THE INVENTION

A general object of this invention is to provide an efficient gas selective filter using a graphene membrane for gas separation (e.g. $H_2/CO_2$, $H_2/CH_4$, $CO_2/N_2$ and $CO_2/CH_4$ separation).

One of the specific objects of this invention is to provide an efficient gas selective filter for $CO_2$ capture.

It is advantageous to provide a gas selective filter, having a high gas permeance, combined with high separation selectivity, in particular $H_2/CO_2$, $H_2/CH_4$, $CO_2/N_2$ and/or $CO_2/CH_4$ separation selectivity.

It is advantageous to provide a gas selective filter having stable gas separation performance over multiple separation cycles, in particular over multiple cycles of heating and cooling.

It is advantageous to provide a gas selective filter having stable gas separation performance over multiple separation cycles, in particular under high pressures (e.g. at least up to 7 bars transmembrane pressure).

It is advantageous to provide crack- and tear free atom-thick graphene membranes of large area for a gas selective filter.

It is advantageous to provide crack- and tear-free atom-thick graphene membrane having a production cost that allows a large-scale use.

It is advantageous to provide a support for atom-thick graphene membrane allowing the transfer of rather large area CVD single-layer graphene to a porous support, while not compromising the gas filtration properties of the graphene.

It is advantageous to provide a cost-effective method for the preparation of crack- and tear-free atom-thick graphene membranes of large area useful for selective gas separation.

It is advantageous to provide a method for transfer of rather large area (e.g. 1 mm² and higher) CVD single layer graphene onto a supporting structure without cracks or tears.

It is advantageous to provide an easily scalable method for tuning graphene membrane separation performance, depending on the aimed specifications (e.g. feed specifications and purity and recovery requirements).

An object of this invention is to provide a gas selective filter comprising a graphene membrane, and a method for the preparation of a gas selective filter comprising a graphene membrane, which is cost effective, has good gas selectivity, and has high performance.

Objects of this invention have been achieved by providing a gas selective separation filter according to claim 1 and a method for the preparation of a gas selective separation filter according to claim 5.

Disclosed herein is a method for the preparation of a gas selective separation filter comprising the steps of:
a) providing a graphene membrane on a sacrificial support layer;
b) coating said graphene membrane with an organic precursor of a porous carbon substrate;
c) subjecting the organic precursor to a pyrolysis in an inert atmosphere, such that the organic precursor is transformed into said porous carbon substrate on the graphene membrane, wherein the porous carbon substrate has a porosity in a range of 5% to 90%;
d) mounting the combined porous carbon substrate and graphene membrane on a macroporous support structure;
e) removing, before or after step d), at least portions of the sacrificial support layer to allow gas flow through the combined porous carbon substrate and graphene membrane.

Also disclosed herein is a gas selective filter comprising a nanoporous graphene membrane having a thickness of about 0.34 to 2 nm and a porosity greater than 0.001%, a porous carbon substrate on which the graphene membrane is mounted, the porous carbon substrate having a porosity in a range of 5% to 90% and an $H_2$ permeance greater than the $H_2$ permeance of the graphene membrane, and a porous support structure on which the graphene membrane and porous carbon substrate are mechanically supported.

Also, disclosed herein is a use of a gas selective filter comprising a graphene membrane on a porous carbon substrate, for gas separation, in particular for separating $H_2$, $N_2$ and/or $CH_4$ from $CO_2$ and from larger molecular weight hydrocarbons (e.g. $C_2H_2$, $C_2H_4$, $C_2H_6$, $C_3H_6$, $C_3H_8$).

Further disclosed herein, according to another aspect of the invention, is a process for improving the gas filtration performance of a nanoporous graphene membrane, said process comprising the steps of:
(i) Providing a graphene membrane on a porous support;
(ii) Subjecting said graphene membrane to a treatment with ozone with ozone concentration of 1%-25%, and treatment time of 1 milliseconds to 1 day, typically from about 1 second to about 60 minutes, at temperature of 25° C. to 300° C., typically from 25° C. to 100° C.

The process may further include:
(iii) Storing the graphene membrane at 25° C. to 200° C. under atmospheric or inert environment.

In an advantageous embodiment, the $H_2$ permeance of the graphene membrane is from about $10^{-8}$ mol m$^{-2}$ s$^{-1}$ Pa$^{-1}$ to about $10^{-4}$ mol m$^{-2}$ s$^{-1}$ Pa$^{-1}$ (e.g. $10^{-7}$ to $10^{-6}$ mol m$^{-2}$ s$^{-1}$ Pa$^{-1}$).

In an advantageous embodiment, the porosity of the graphene membrane is formed by pores in the nanoporous graphene membrane with a mean size between about 0.2 nm and about 0.5 nm, preferably between about 0.25 nm and 0.3 nm. The porosity of the nanoporous graphene membrane is preferably greater than 0.01%, more preferably greater than 0.1%, and may be up to 5%.

In an advantageous embodiment, the porous carbon substrate has a porosity greater than 10%, more particularly in a range of 20% to 70%, formed by pores having a mean size (i.e. width or diameter of circumscribed pore circle) in a range of about 10 nm to about 1000 nm, preferably 10 nm to about 100 nm.

The porous carbon substrate according to embodiments of the invention has an $H_2$ permeance at least 10 times, generally more than 100 times greater than the $H_2$ permeance of the graphene membrane.

The porous support structure may have pores of a mean size in a range of 0.01 μm to 100 μm, for instance in a range of 0.1 μm to 20 μm, more particularly in a range of 1 μm to 10 μm.

The porous support structure may have a porosity in a range of 2% to 60%, preferably greater than 5%, for instance between 5% to 25%, to ensure on the one hand sufficient structural strength and on the other hand good permeance (in comparison to the graphene membrane) in order to contribute a negligible or low increase in resistance against the gas flow through the filter.

The porous support structure may have a thickness in a range of 10 μm to 10000 μm, typically 20 μm to 100 μm (e.g. 50 μm).

Advantageously, the porous carbon substrate provides optimal support for the graphene layer that allows the sacrificial support layer to be removed, and the graphene layer to be mounted on a mechanical support structure, without inducing tears or cracks in the graphene layer by inter alia limiting thermal and mechanical stresses on the graphene layer during the transfer process. The porosity of the carbon substrate may be easily configured for optimal properties, on the one hand to avoid excessive resistance to gas flow compared to the graphene membrane, yet to avoid too large pores that reduce support of the graphene layer. Compatibility of the graphene to carbon substrate is also very advantageous for bonding of graphene layer to the porous carbon layer and reducing relative thermal dilatation.

In an advantageous embodiment, the removing of at least portions of the sacrificial support layer comprises etching said portions of the sacrificial support layer in an etching chamber containing an etchant to etch the sacrificial support layer.

In an advantageous embodiment, the etching is performed prior to mounting the porous carbon support and graphene membrane on the macroporous support structure to obtain a free-standing combined porous carbon substrate and graphene membrane suspended in the etchant solution.

In a variant however, within the scope of the invention, the porous carbon support and graphene membrane formed on the sacrificial support layer may be mounted on the macroporous support structure prior to removal of all or portions of the sacrificial support layer. The sacrificial support layer may then be removed at least in part while the various layers are mounted on the macroporous support structure. The macroporous support structure may either be mounted with the porous carbon substrate positioned against the macroporous support structure, or alternatively with the sacrificial layer positioned against the macroporous support structure. In the latter variant, removal of the sacrificial layer may be partial and limited to the surface areas of the sacrificial layer exposed by the pores of the macroporous support structure.

Although removal of the sacrificial layer by etching is preferred, other removal methods may be implemented within the scope of the invention, for instance by the electrochemical bubbling technique where graphene is delaminated from the Pt support allowing reuse of the Pt support.

The mounting of the combined porous carbon substrate and graphene membrane on said macroporous support is preferably carried out by a wet transfer process in a liquid bath.

The organic precursor is preferably in a solution coated on the graphene membrane layer formed on the sacrificial support layer, and the solution is then dried until a film of the organic precursor is formed on the surface of the graphene membrane.

The porous support structure has the function of providing mechanical support for the porous carbon substrate and graphene membrane and should provide a negligible or low resistance to gas flow through the filter in relation to the graphene membrane. The solid surface areas of the support structure should also cover the graphene membrane membrane as little as possible in order to expose as much of the graphene surface area as possible to gas flow. Preferably, the porous support structure has a porosity greater than 5%. The pores of the porous support preferably have an average diameter greater than 0.01 μm and preferably less than 100 μm to ensure good support of the porous carbon substrate (in particular to avoid cracking of the carbon substrate) for instance in a range of 0.1 μm to 20 μm and more particularly in a range of 1 μm to 10 μm.

In an advantageous embodiment, the graphene membrane is a chemical vapor deposition (CVD) graphene layer, in particular a CVD derived substantially monolayer graphene having a thickness of about 0.34 to 2 nm.

In an advantageous embodiment, the sacrificial support layer comprises or consists of an etchable metal foil, preferably a Cu film or foil, of thickness in a range of about 0.1 to 1000 μm, typically from 1 to 100 μm, for instance in a range of 10-50 μm thickness. The thickness of the sacrificial layer is configured to offer good mechanical support during the graphene membrane formation and subsequent coating of the precursor material of the porous carbon support, yet allow efficient removal of the sacrificial layer.

In an advantageous embodiment, the organic precursor of the porous carbon structure is an amphipathic block copolymer.

Other features and advantages of the invention will be apparent from the claims, detailed description, and figures.

DETAILED DESCRIPTION OF EMBODIMENTS OF THE INVENTION

The expression "graphene membrane" is a graphene layer, in particular a graphene monolayer such as obtained for example by CVD. For example, a single-layer graphene membrane has a thickness in a range of about 0.34 to 1 nm. The graphene membrane according to embodiments of the invention may however also include bilayer graphene, or portions with bilayer graphene, it being understood that achieving a highly homogeneous monolayer over the surface area of the membrane may not be efficient for an industrial scale manufacturing of the membrane.

The expression "sacrificial support layer" is a suitable support (e.g. a Cu, Ni, Pt or any other metallic substrate on which single-layer graphene can be synthesized), in particular a non-porous support, for a graphene membrane that can be sacrificed before or after the graphene membrane is applied to a structural (mechanical) support.

The expression "an organic precursor of a porous substrate" refers to a any organic agent which can form a film on a graphene surface and can be transformed into a porous carbon substrate having pores from about 10 nm to about 1000 nm after pyrolysis. According to a particular aspect, an example of an organic precursor of a porous structure is a block copolymer, in particular an amphipathic block copolymer, more particularly a block copolymer which when coated as a thin film undergoes phase separation into hydrophilic (e.g. polyvinyl pyridine) and hydrophobic (e.g. polystyrene) domains upon drying such as those described in Rodriguez et al., 2007, *Adv. Funct. Mater.*, 17, 2710-2716 or Yoo et al., 2015, *Sci. Adv.*, 1(6), 1-7 or Jackson, E. A.; Hillmyer, M. A. *Nanoporous Membranes Derived from Block Copolymers: From Drug Delivery to Water Filtration. ACS Nano* 2010, 4, 3548-3553. According to a particular embodiment, are used as organic precursor of a porous carbon structure according to the invention a block copolymer preferably soluble in N,N-dimethylformamide.

The expression "membrane performance" refers to the combination of the membrane gas permeance and its gas selectivity. Typically, in the field of gas separation, $H_2$ permeance of $10^{-8}$ mol m$^{-2}$ s$^{-1}$ Pa$^{-1}$ and higher and $H_2/CH_4$ selectivities of 6 or higher is considered as a good membrane performance.

Figure 1:
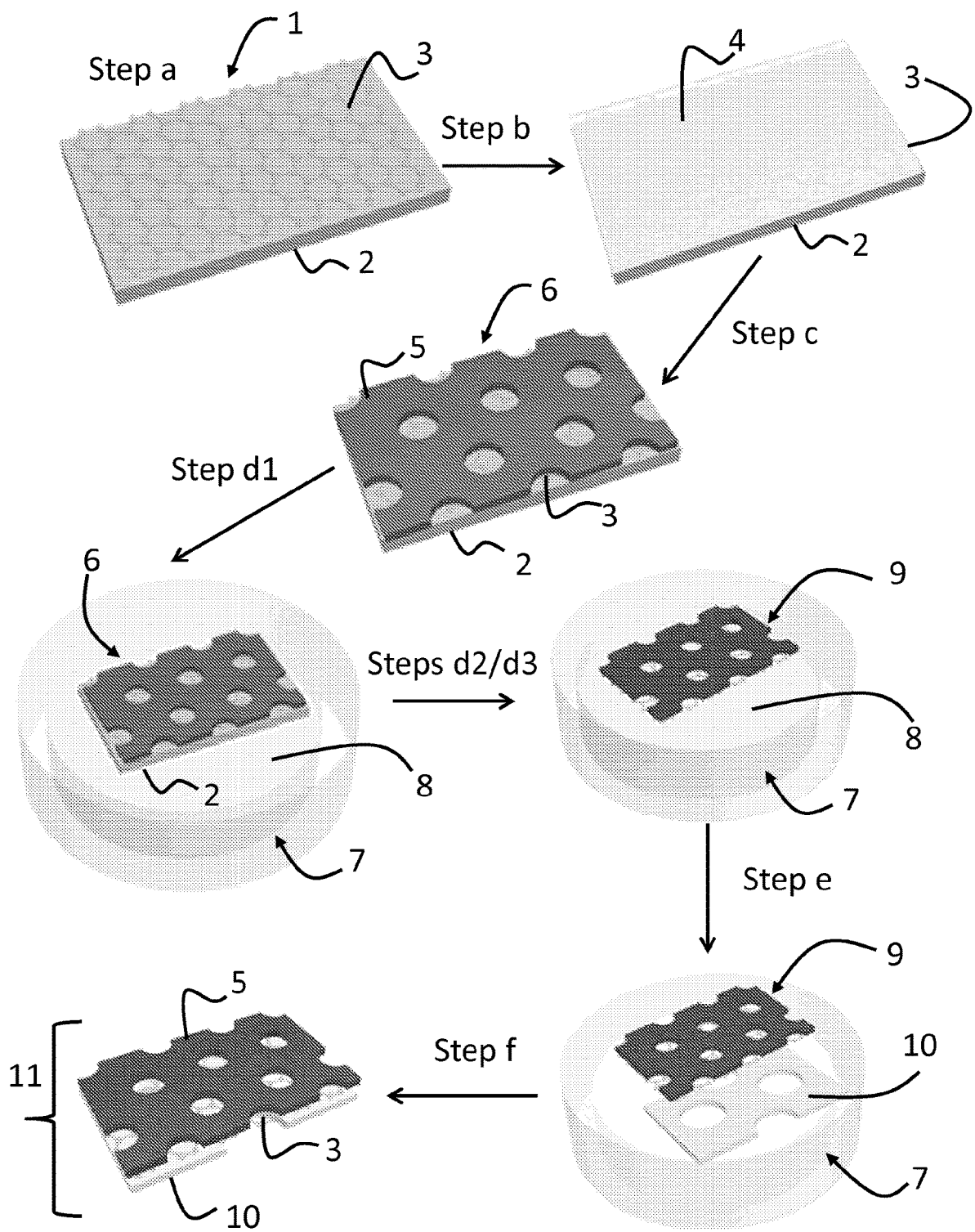
FIG. 1 is a schematic illustration of the preparation of a gas selective filter with a graphene membrane by a carbon substrate-assisted transfer method according to an embodiment of the invention.

Referring to the figures, in particular first to FIG. 1, is provided an illustration of a method for the preparation of a gas selective filter comprising a single layer graphene crack- and tear free membrane according to an embodiment of the invention. The illustrated method for the preparation of a gas selective filter generally comprises the steps of: providing a graphene membrane on a sacrificial support layer; coating said graphene membrane with an organic precursor of a porous carbon substrate; subjecting the organic precursor to a pyrolysis in an inert atmosphere, such that the organic precursor is transformed into said porous carbon substrate on the graphene membrane, wherein the porous carbon substrate has a porosity in a range of 5% to 90% and an $H_2$ permeance at least 10 times greater than the $H_2$ permeance of the graphene; mounting the combined porous carbon substrate and graphene membrane on a macroporous structural support; and removing at least portions of the sacrificial support layer to allow gas flow through the combined porous carbon substrate and graphene membrane. The porous substrate can be flat or can be curved, for instance tubular.

More specifically, the steps of the embodiment illustrated in FIG. 1 comprise:
  a) Providing a CVD graphene membrane 3 (in particular a graphene monolayer) on a sacrificial support layer 2 to form a supported graphene membrane 1;
  b) Coating said graphene membrane 3 with a solution comprising an organic precursor of a porous carbon substrate and leaving the solution to dry until a film of the organic precursor 4 is formed on the surface of the graphene membrane;
  c) Subjecting the film of the organic precursor 4 to a pyrolysis under inert atmosphere such that the film of the organic precursor 4 is transformed into a porous carbon substrate 5 on the surface of the graphene membrane 3, wherein the porous carbon layer has a porosity of about 5% to about 90%, typically from 10% to 80%, preferably more than 20% and typically less than 70%;
  d) Placing the combined porous carbon substrate with graphene membrane on the sacrificial support layer 2 obtained under step c) in an etching chamber 7 containing an etchant 8 to etch the sacrificial support layer 2 and obtain a porous carbon substrate supported graphene membrane suspended in the etchant solution;
  e) Transferring the carbon substrate supported graphene membrane 9 obtained under step d) to a macroporous support 10 to obtain (step f)) a gas selective filter sheet 11 comprising the combined layers of porous carbon substrate 5, graphene membrane 3 and macroporous support structure 10.

According to a particular embodiment, the CVD graphene layer is synthesized by low-pressure chemical vapor deposition (LPCVD).

According to embodiments, the graphene membrane has a thickness of about between 0.34 nm and 2.0 nm.

According to embodiments, the mean size of the pores the nanoporous graphene membrane is in a range of 0.2 nm to 0.5 nm, in particular in a range of about 0.25 nm to about 0.3 nm.

According to a particular embodiment, the sacrificial support layer 2 is a Cu foil of about 10-100 µm thickness, in particular about 10-50 µm thickness, for instance about 25 µm thickness.

According to a particular embodiment, the organic precursor of the porous carbon substrate is an amphipathic block copolymer, in particular a block copolymer of polyvinylpyridine and polystyrene monomers, for example block-copolymer polystyrene-co-poly(4-vinylpyridine) (PS-P4VP).

According to a particular embodiment, the coating solution used under step b) is a solution of turanose and block-copolymer polystyrene-co-poly(4-vinylpyridine) (PS-P4VP) dissolved in N,N-dimethylformamide such that concentration of turanose and block-copolymer are 1-10% and 1-10% (w/w), respectively.

According to another particular embodiment, the coating solution used under step b) is treated at high temperature such as from about 50 to about 200° C. (e.g. 180° C.) before coating to anneal the film facilitating the phase separation into the hydrophilic and the hydrophobic domains.

According to a particular embodiment, the coating under step b) is carried out by spin-coating.

According to another particular embodiment, pyrolysis is conducted under step c) at about 400-1000° C., in particular at about 500° C., for about 1 hour.

According to another particular embodiment, pyrolysis is conducted under step c) under a $H_2/Ar$ flow.

According to another particular embodiment, the porosity of the porous carbon substrate 5 is such that it has pores with an average diameter of 10 to 50 nm, and porosity of about 20-70% such that a significant area of graphene is exposed (i.e. not covered by the porous carbon substrate 5).

According to another particular embodiment, the etchant solution is a solubilizing solution for the sacrificial support layer 2 (e.g. a solution of 0.2 M $Na_2S_2O_8$ in water for a Cu supporting layer).

According to another particular embodiment, the combined porous carbon substrate and graphene membrane 9 obtained under step d) is rinsed to remove residuals (e.g. in deionised water).

According to another particular embodiment, the porous support structure 7 has pores having an average diameter more than 0.01 µm and less than 100 µm, typically less than 20 µm.

According to another particular embodiment, the macroporous support structure 7 has a thickness of 10 µm to about 10000 µm, typically of 20 µm to about 100 µm.

According to further particular embodiment, the macroporous support structure 7 is selected from sintered ceramic (such as alumina, silica etc.) and metal (stainless steel, inconel, hastelloy etc.).

According to a further particular embodiment, the macroporous support structure 7 is a tungsten (W) foil having from about 20 to about 100 µm thickness (e.g. 50 µm) and having a porosity of 2% to about 50%, typically 5%-15%, and average pore sizes of 0.1 µm to 100 µm, typically 1 µm to 10 µm, for instance about 5 µm.

According to a further particular embodiment, the gas selective filter sheet 11 obtained under step f), has a $H_2$ permeance from about $10^{-8}$ mol $m^{-2}$ $s^{-1}$ $Pa^{-1}$ to about $10^{-4}$ mol $m^{-2}$ $s^{-1}$ $Pa^{-1}$ (e.g. $10^{-7}$ to $10^{-6}$ mol $m^{-2}$ $s^{-1}$ $Pa^{-1}$).

According to another further particular embodiment, gas selective filter sheet 11 obtained under step f) has a $H_2/CH_4$ selectivity from about 3 to about 1000 (e.g. about 20).

According to another further particular embodiment, gas filtration performance of the graphene membrane is improved by subjecting a supported graphene membrane to a treatment with ozone under inert atmosphere for about 1 ms to about 1 month, typically from about 30 s to about 60 minutes.

According to another further particular embodiment, a method according to the invention further comprises a functionalization step g) of the graphene membrane by subjecting the gas selective filter sheet 11 to a treatment with ozone under inert atmosphere for about 1 ms to about 1 month, typically from about 30 s to about 60 minutes.

According to another further particular embodiment, a method according to the invention further comprises carrying out the functionalization step g) at a temperature between about 25° C. and 200° C., more preferably between 25° C. and about 120° C.

According to another further particular embodiment, the gas filtration performance can be tuned to process different feed specifications and purity and recovery requirements through gas filtration performance ozone treatment conditions. For example, a separation process can require either more selective membrane or more permeable membranes depending on the feed concentration, permeate purity (90%, 95%, 99%, etc. where higher purity will require high selectivity membranes), overall recovery (80%, 90%, 95%) or cost (lower cost can be obtained by using more permeable membranes).

Typically, a functionalization step g) carried out at a temperature of about 0-60° C. (e.g. 25° C.) allows increasing the $H_2/CH_4$ selectivity of the graphene membrane.

Typically, a functionalization step g) carried out at a temperature of about 60-150° C., preferably 80-100° C. allows increasing the $H_2$ permeance of the graphene membrane.

According to a particular aspect, the gas selective filters according to the invention can be advantageously used for the separation of $H_2$ from $CH_4$ as well from larger molecular weight hydrocarbons or for processing synthetic gas (syngas) for removing impurities or adjust the $H_2/CO$ ratio for a particular downstream application.

Gas selective filters according to the invention used in combination with dehydrogenation reactors as a membrane reactor (for example for the production of olefins from alkanes) for increasing the efficiency of the process by removing $H_2$ and increasing the overall conversion. Further, graphene membranes according to the invention can be attractive for carbon capture ($H_2/CO_2$, $H_2/CH_4$, $CO_2/N_2$ and $CO_2/CH_4$ separation).

The remarkable observed temperature stability of the gas selective filters according to the invention would allow their use as a valuable replacement for polymeric membranes having a short life cycle, especially at high pressure (5-20 bar) and temperature (100-250° C.).

The invention having been described, the following examples are presented by way of illustration, and not limitation.

EXAMPLES

Example 1: Method of Support-Assisted Transfer of Single Layer Graphene onto a Porous Substrate A method of the invention for the preparation of crack- and tear free atom-thick graphene membrane comprising a step of support-assisted transfer of a single layer graphene onto a porous substrate is illustrated on FIG. 1 and as detailed below.

Step a: A Synthesized CVD Graphene on a Sacrificial Support Layer is Provided.

A supported graphene membrane 1 was provided as a CVD graphene monolayer 3 supported on a sacrificial support layer 2 which was synthesized by the low-pressure chemical vapor deposition (LPCVD) on a copper foil (25 μm, 99.999% purity, Alfa-Aesar). Before CVD, the copper foil was annealed at 1000° C. in $CO_2$ atmosphere for 30 min to remove most of organic contamination. Then, 8 sccm of $H_2$ was induced to purge the $CO_2$ and anneal the copper surface. Subsequently, 24 sccm of $CH_4$ was added to initiate graphene crystallization. After graphene growth (for 30 min), $CH_4$ flow was switched off.

Step b: Coating the Graphene Membrane on a Sacrificial Support Layer with an Organic Precursor of a Porous Carbon Structure 0.2 g turanose (Sigma-Aldrich) and an amphipathic block copolymer (0.1 g block-copolymer polystyrene-co-poly(4-vinylpyridine) (PS-P4VP) (Sigma-Aldrich) as an organic precursor of a porous carbon structure according to the invention are dissolved in N,N-dimethylformamide. Turanose helps in modulating the pore-size of the subsequent carbon film. The obtained solution was treated at 180° C. to improve the hydrogen bonding between turanose and P4VP domains of the block-copolymer and then was spin-coated on top of the graphene surface and dried at room temperature. The block-copolymer film then undergoes phase separation into hydrophobic and hydrophillic domains upon drying as earlier described (Rodriguez et al., 2007, *Adv. Funct. Mater.*, 17, 2710-2716).

Step c: Transforming the Polymer into a Porous Carbon Layer by Pyrolysis

The dried co-polymer film formed under step (b) on the surface of the graphene membrane is then pyrolyzed at 500° C. under inert atmosphere (in the flow of $H_2$/Ar) for 1 h, leading to the formation of a porous carbon substrate 5 on top of the graphene layer 3, exposing a significant area of graphene (ca. 50%).

Step d: Removing the sacrificial support by etching

The composite structure 6 formed by the sandwiched graphene layer 3 between the newly generated porous carbon substrate 5 and the sacrificial Cu support layer 2 obtained under step (c) is then placed in an etching chamber 7 containing an etchant solution 8 (0.2 M $Na_2S_2O_8$ in water) (d1) to etch the sacrificial Cu support layer 2 to obtain a free-standing carbon substrate supported graphene membrane 9 suspended in the etchant solution 8 (d2) which is then rinsed in deionised water to remove residuals from the etching of Cu (d3).

Step e: Transfer of the Combined Porous Carbon Substrate and Graphene Layer on a Macroporous Support Next, the carbon substrate supported graphene membrane 9 is transferred to a macroporous support 10 (e.g. 5 μm pores in 50 μm thick W foil wherein the pores were previously incorporated in the W foil by laser drilling, FIG. 1, step e) by wet-transfer in the etching chamber 7 by gently placing the W foil below the floating graphene membrane such that the combined porous carbon substrate and graphene layer 9 is deposited on the macroporous support 10 when the fluid level in the etching chamber 7 is lowered.

Step f: Obtaining a Gas Selective Separation Filter Sheet

A gas selective filter sheet 11 comprising the graphene membrane 3 on the porous carbon substrate 5 and the macroporous support structure 10 (e.g. W foil is thus obtained and then removed from the etching chamber 7 for use in various applications. The filter sheet may be assembled to additional structural sheets and elements for integration into a filter unit for installation in a gas flow device to separate gases. The filter unit may comprise a large plurality of filter sheets, for instance arranged in honeycomb structure covering a few $cm^2$ to up to for instance a $m^2$ surface area, depending on the application and gas flow rate to be treated.

Example 2: Characterization of the Porous Carbon Layer and Graphene Membrane

Figure 2:
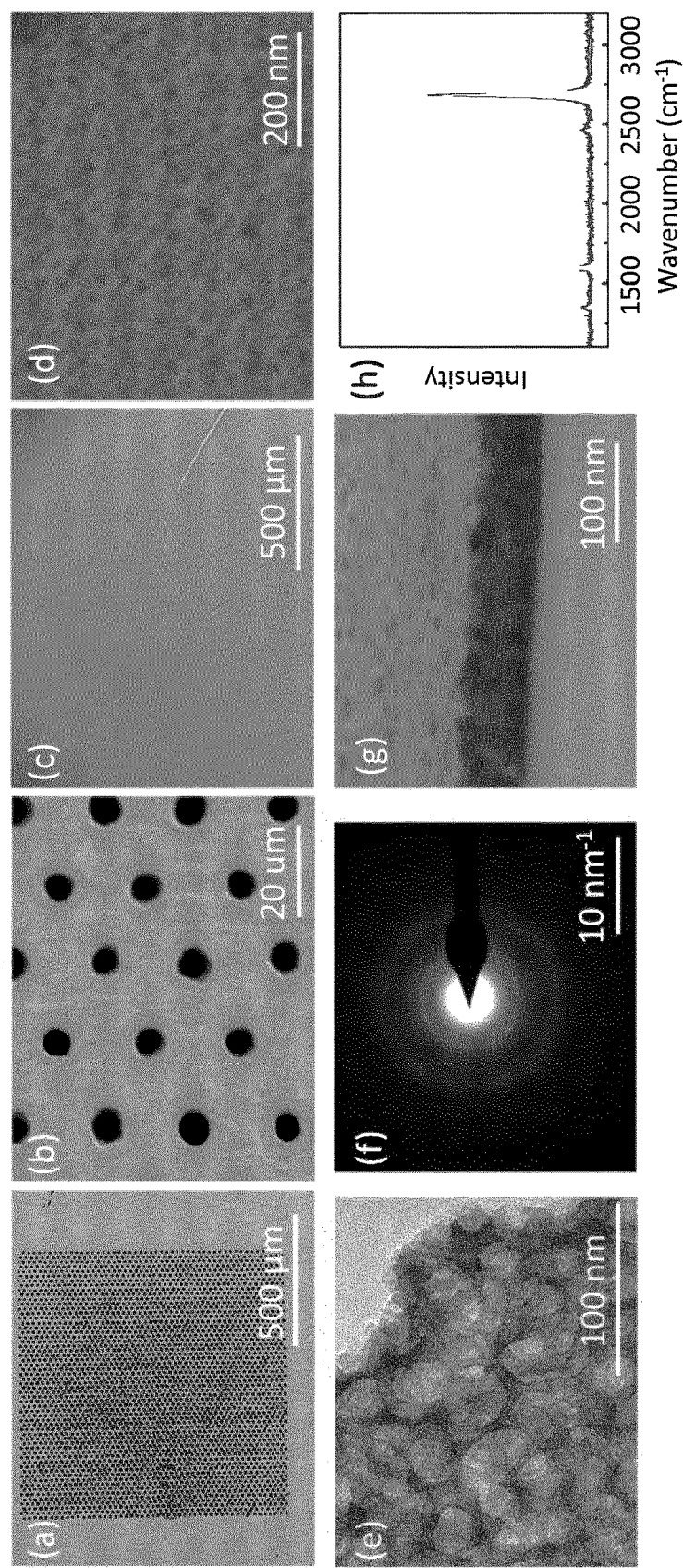
FIG. 2 provides characterization of the structure of the porous carbon substrate supported graphene membrane of an embodiment of the invention obtained under Example 1 and its elements were characterized by scanning electron microscopy (SEM) and transmission electron microscopy (TEM) imaging as described under Example 2. a-b) SEM image of a porous tungsten substrate, arrays of 5 μm pores spread in a 1 mm² area on the tungsten foil (50 μm thick). c) SEM image of carbon substrate on graphene membrane according to an embodiment of the invention on a porous tungsten support substrate. d) SEM image of porous carbon substrate on top of graphene. e) TEM image of porous carbon substrate and single layer graphene membrane of the invention on TEM grid. f) Diffraction pattern of graphene through a porous carbon substrate and single layer graphene membrane according to an embodiment of the invention. g) SEM image of cross-section of the porous carbon substrate and single layer graphene membrane according to an embodiment of the invention. h) A typical Raman spectrum from the single-layer LPCVD graphene.

The structure of the porous carbon layer and graphene membrane of the invention obtained under Example 1 and its elements were characterized by scanning electron microscopy (SEM) and transmission electron microscopy (TEM) imaging as shown on FIG. 2.

Scanning electron microscopy (SEM) was carried out by using FEI Teneo SEM. No conductive coating was applied on the substrates prior to SEM. Transmission electron microscopy (TEM) imaging and electron diffraction of the carbon substrate and the composite graphene/carbon substrate were conducted by FEI Tecnai G2 Spirit Twin with 120 keV incident electron beam.

High-resolution TEM (HRTEM) was conducted on a standalone graphene membrane (without the carbon film) transferred on a quantifoil TEM grid by the traditional wet-transfer technique (Robeson et al., 2008, *J. Memb. Sci.*, 320, 390-400). Aberration-corrected (Cs) HRTEM was performed using a double-corrected Titan Themis 60-300 (FEI) equipped with a Wein-type monochromator. To reduce the electron radiation damage, a 80 keV incident electron beam was used for all experiments. The incident electron beam was monochromatic ("rainbow" mode illumination) to reduce the energy spread in region of interest. HRTEM images were post-treated using a combination of Bandpass and Gaussian filters.

Raman characterization was carried on standalone graphene (without carbon film) transferred onto the $SiO_2$/Si wafer by the wet-transfer method[4]. Single-point data collection and mapping were performed using Renishaw micro-Raman spectroscope (532 nm, 2.33 eV, 100× objective). Analysis of the Raman data was carried out using MATLAB. For calculation of the D and the G peak height, the background was subtracted from the Raman data using the least-squares curve fitting tool (lsqnonlin).

Inspection of the supported graphene membrane obtained under Example 1 by optical and electron microscopy confirmed that there were no visible tears or cracks in the surface of the transferred combined porous carbon substrate and graphene membrane (FIG. 2c) when one compares with the surface of the macroporous substrate surface before transfer (FIG. 2a-b). SEM images of the composite structure 6 formed by the sandwiched graphene layer 3 between the porous carbon substrate 5 and the sacrificial Cu support layer 2 obtained under step (c) (FIG. 2d) and TEM images of the carbon substrate supported graphene membrane 9 obtained after Cu foil etching under step d1 and transferred on a TEM grid (before its transfer on a macroporous support) (FIG. 2e) revealed, after an analysis of the PSD (pore-size-distribution), that the carbon substrate presents pores with diameter between 20-30 nm. Selected area electron diffraction (SAED) of the carbon substrate supported graphene membrane 9 obtained after Cu foil etching under step d1 (FIG. 2f), collected on a TEM grid, displayed the typical diffraction peaks of a suspended single-layer graphene, representing periodicities of 0.213 and 0.123 nm (Meyer et al., 2007, *Nature*, 446, 60-63). The carbon substrate contributed to the SAED with a broad rings, a characteristic of amorphous carbon substrates (FIG. 2f). No area representing only the carbon substrate could be found, indicating that graphene and the carbon substrate bonded strongly during the pyrolysis step. This is a very important feature which was not expected and which allows achieving a crack-free transfer of the graphene, since non-bonded graphene layer may break and detach during the transfer step.

Interestingly, even a macroscopic fold as shown in FIG. 2b did not break the membrane making this process highly promising for the potential scale-up of single-layer graphene membrane.

SEM image of the carbon film indicated that the thickness of the carbon substrate was ca. 100 nm (FIG. 2g).

Example 3: Porosity and Gas Separation Performance of the Carbon Substrate Supported Graphene Membrane Using scanning tunneling microscopy (STM), it was shown that CVD derived graphene hosts an ultralow density of intrinsic defects, including nanopores made from 10 to 13 missing carbon atoms, that are attractive for the gas separation (Agrawal et al., 2017, *J. Phys. Chem. C.*, 121, 14312-14321). In this study, the density of defects in CVD graphene, was estimated using the carbon amorphization trajectory (Cancado al., 2011, *Nano Lett.*, 11, 3190-3196) ($I_D/I_G$ of 0.07±0.02, FIG. 2h) to be $5.4\times10^{10}$ defects/cm$^2$, corresponding to a porosity of 0.025%. This represents an upper bound of the gas permeable nanopores attributing to a pore-size-distribution in graphene made up of smaller, gas-impermeable pores such as those made by less than 6 missing carbon atoms, as well as larger pores that are suitable for the gas separation.

Figure 3:
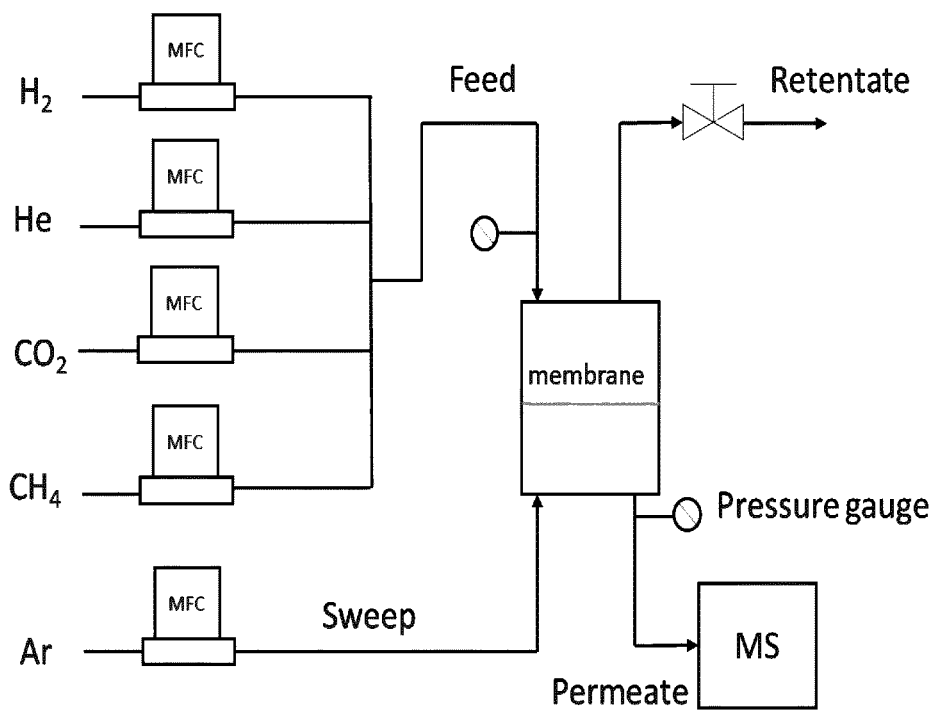
FIG. 3 provides a schematic view of the setup for gas permeance test as described in Example 3.
Figure 4A:
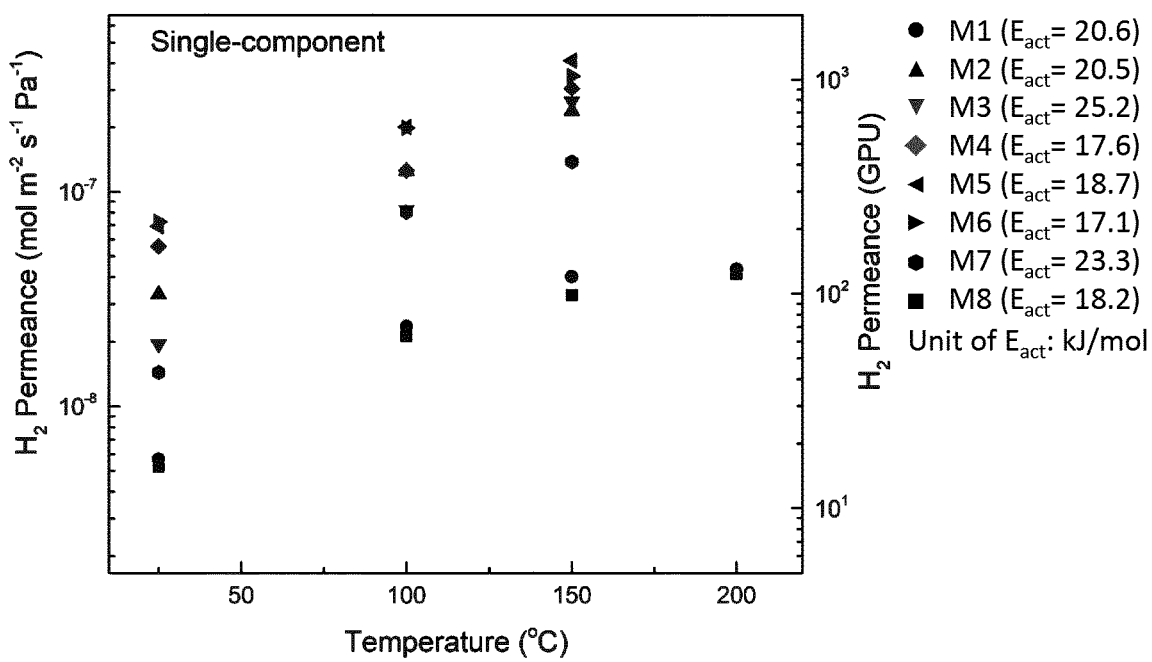
FIG. 4 reports the results of the gas separation performance of eight CVD graphene membranes (M1-M8) according to embodiments of the invention as described in Example 3. The gas transport takes place from the intrinsic defects in graphene. a) $H_2$ permeance as function of temperature by single gas permeance test. b-d) Selectivity of different gases through single gas permeance test, b) $H_2/CH_4$, c) $H_2/CO_2$, d) $He/H_2$. e) Extracted activated energy for gases with different kinetic diameters. f) $H_2$ permeance as function of temperature by mixture gas permeance test. g-i) Separation factors of different gases through mixture gas permeance test, g) $H_2/CH_4$, h) $H_2/CO_2$, i) $He/H_2$.
Figure 4:
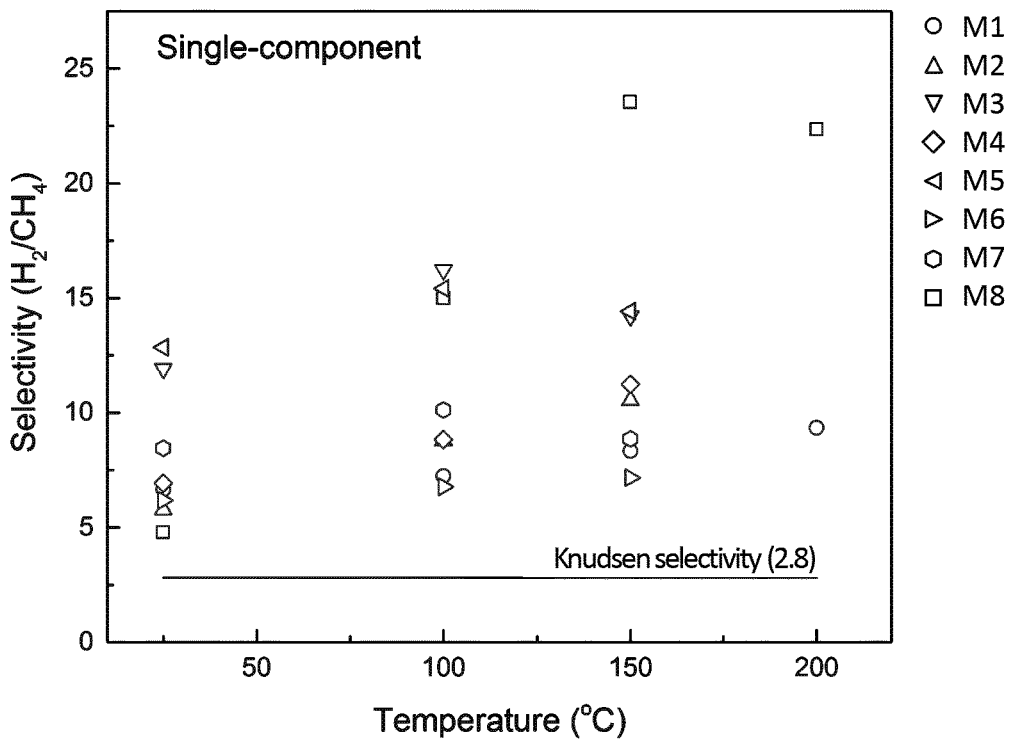
Figure 4:
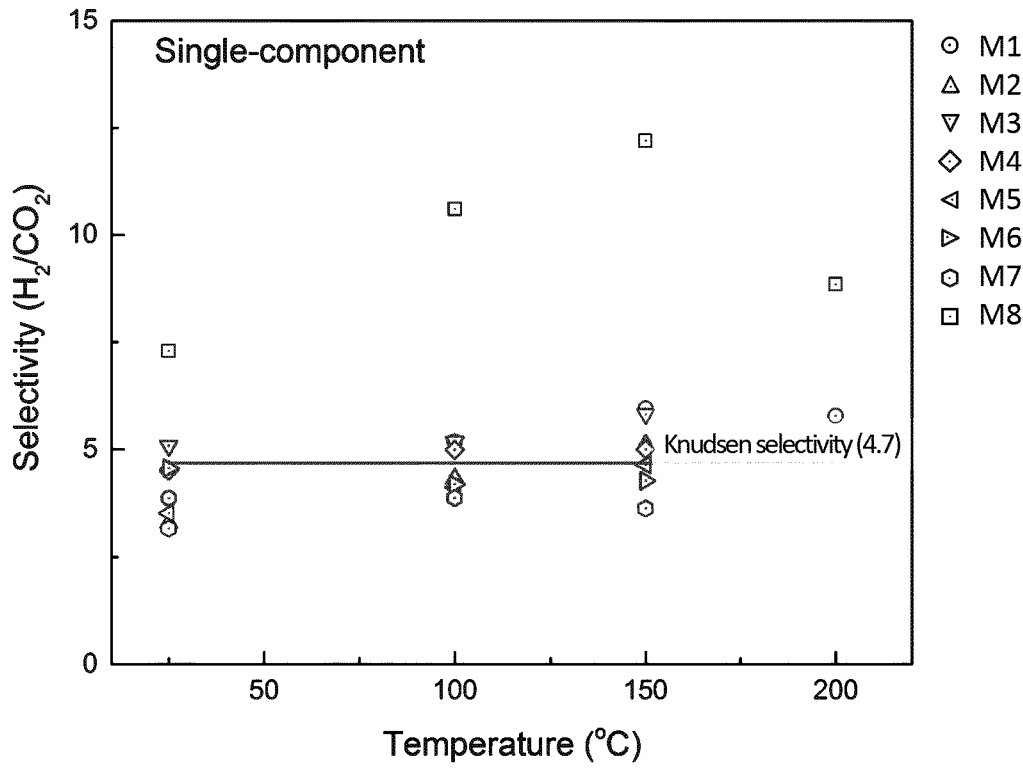
Figure 4:
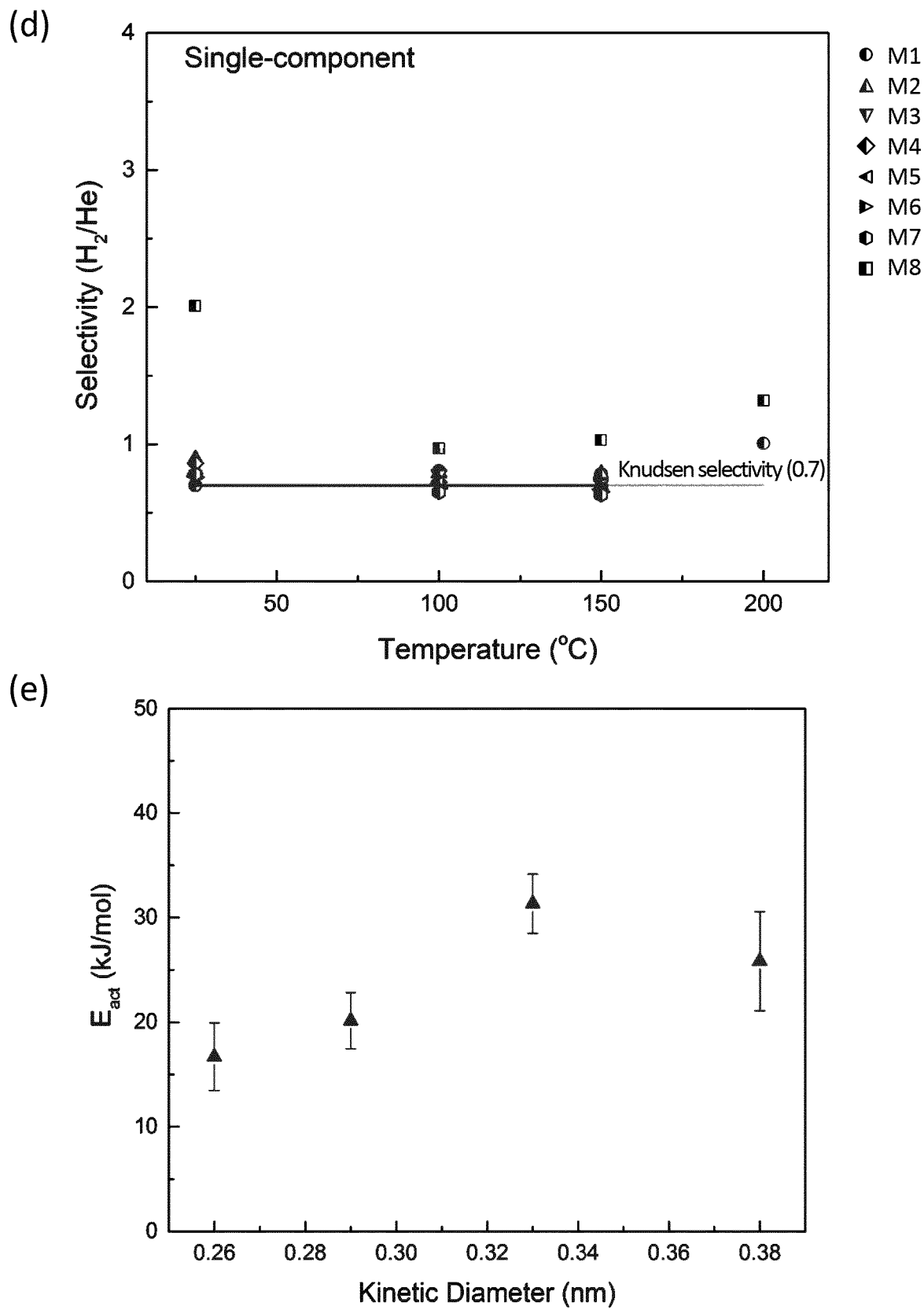
Figure 4:
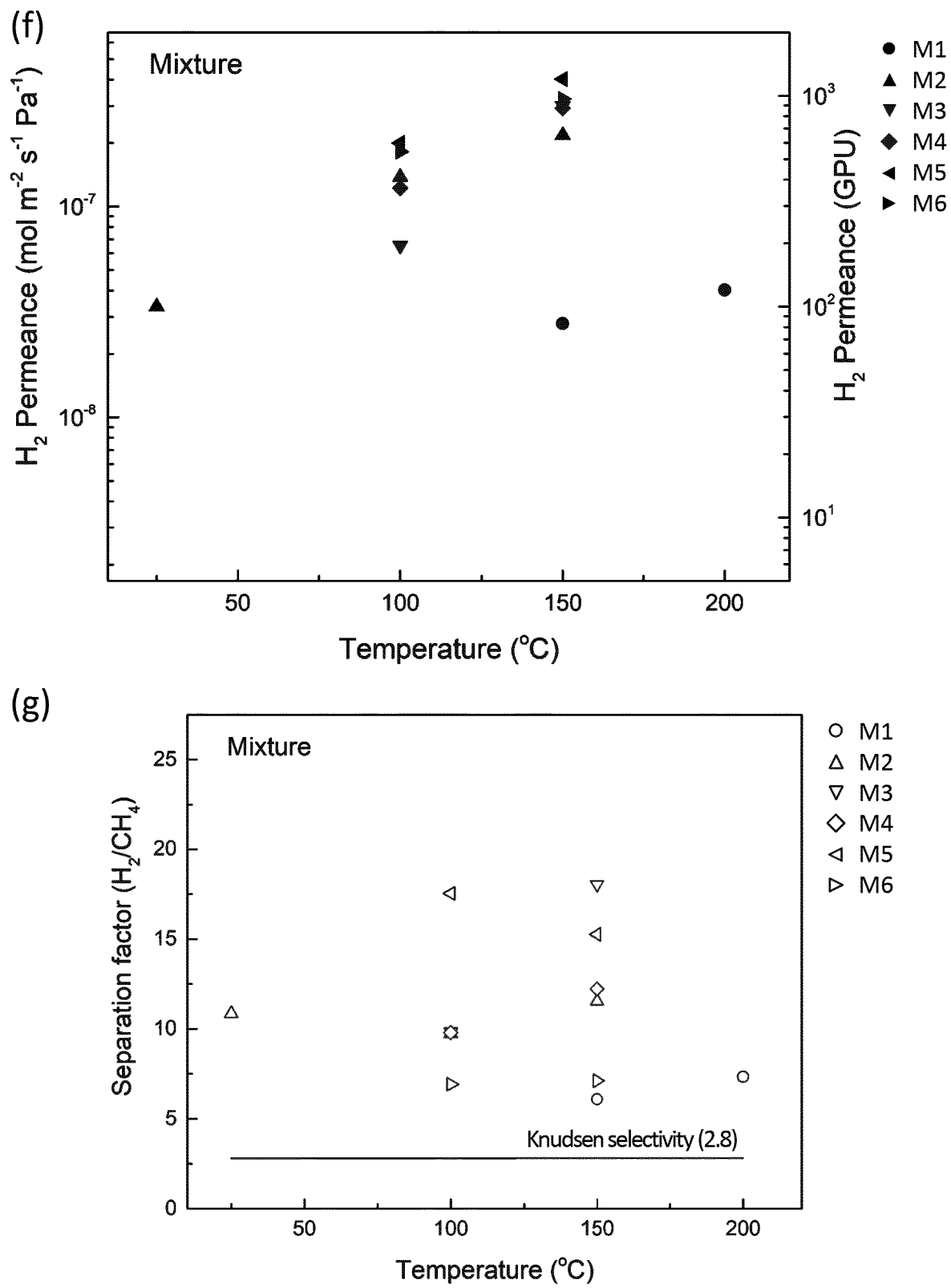
Figure 4:
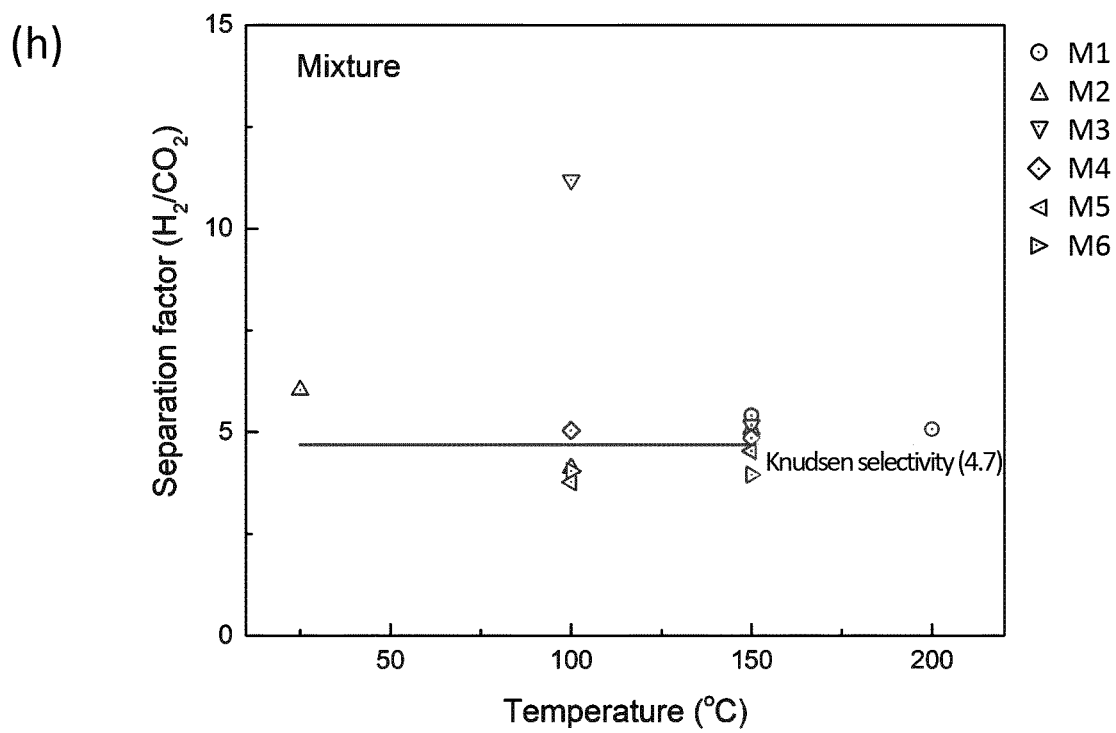
Figure 4:
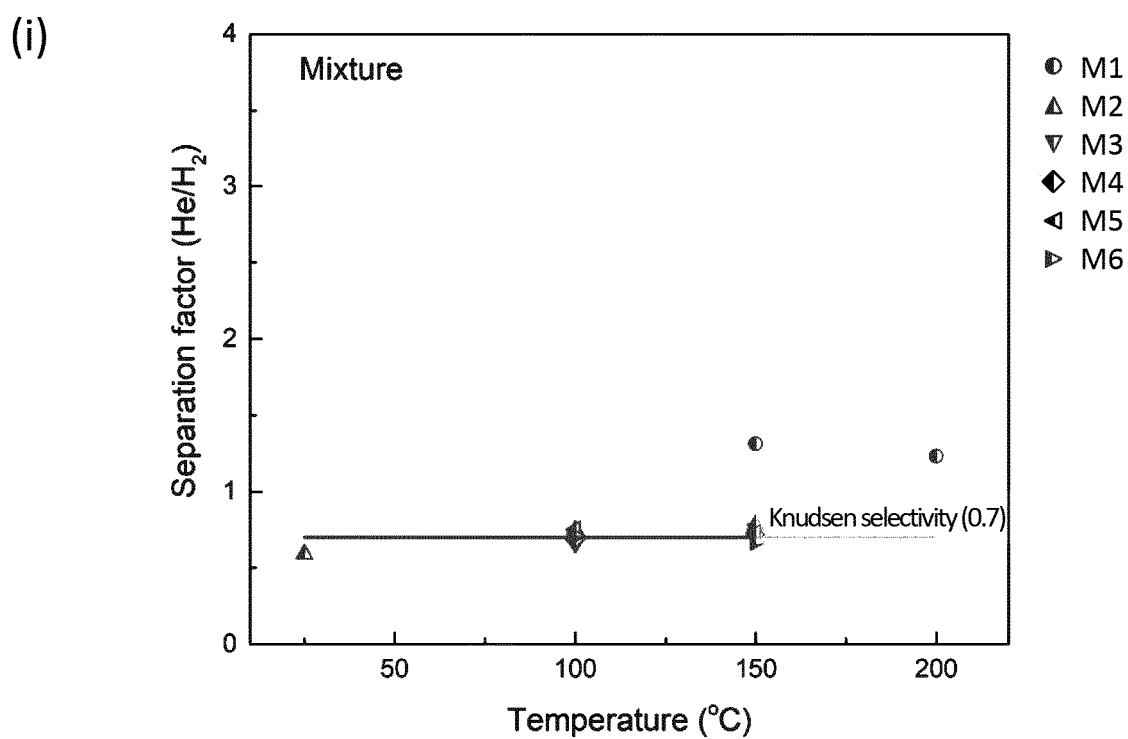

Gas permeation of the graphene membranes obtained under Example 1 was tested in a gas permeation test as described below and schematized under FIG. 3 and compared to that from standalone carbon substrate and the macroporous W support. In all cases, permeance through the graphene membrane was significantly lower than that of the carbon and the W support indicating that graphene did membrane did not have cracks or tears. Before testing, membranes were heated to 150° C. to remove the contaminations on the graphene surface. Membranes were sealed in a homemade permeation cell using a metal face seal directly on top of the W support, ensuring a leak-proof measurement of the gas transport. Typically, the feed side (a pure gas feed or a mixture feed) was pressurized to 1.6-7.0 bars, whereas the permeate side connected to a pre-calibrated mass spectrometer (MS) was maintained at 1 bar with an argon sweep. Mass flow controllers (MFC) regulated the feed gas flow rate, and the feed pressure was controlled by adjusting the back-pressure regulator installed at the downstream. Another MFC controlled the Ar flow rate as the sweep gas, which carried the permeate gas to a calibrated mass spectrometer (MS) for real-time analysis of the permeate concentration. For the mixture permeation tests, an equimolar gas mixture was used on the feed side. To ensure uniformity in the temperature, the feed and the sweep gas lines and the membrane module were heated inside an oven. The gas flux was calculated once the steady-state was established (typically 30 minutes after changing the permeation conditions). Temperature of the membrane was varied between 25-250° C. to study the effect of the temperature on the membrane permeance and the thermal stability of the membranes of the invention. Single-component gas transport from eight different graphene membranes prepared as described in Example 1 and measured as described above revealed $H_2$ permeances in the range of $5.2\times10^{-9}$-$7.2\times10^{-8}$ mol M$^{-2}$ s$^{-1}$ Pa$^{-1}$ (15-215 gas permeation units, GPU) with $H_2/CH_4$, $H_2/CO_2$, and He/$H_2$ selectivities ranging between 4.8-13.0, 3.1-7.2, and 0.7-2.0, respectively, at 25° C. The $H_2$ permeance corresponds to a minimum permeation coefficient of $1.0\times10^{-23}$-$1.3\times10^{-22}$ mol s$^{-1}$ Pa$^{-1}$ based on the defect density of $5.4\times10^{10}$ defects/cm$^2$. This permeation coefficient is consistent with that of a Bi-3.4 Å membrane reported by Koenig et al. 2012, supra where a coefficient of $4.5\times10^{-23}$ mol s$^{-1}$ Pa$^{-1}$ was reported. Interestingly, the $H_2/CO_2$ selectivity is higher than that from a Bi-3.4 membrane where a selectivity of ca. 1.5 was reported. One membrane (M8) displayed the best molecular sieving performance, displaying a He/$H_2$ selectivity greater than 1, implying that the mean pore-size in M8 was less than the kinetic diameter of $H_2$ (0.289 nm).

The permeance of He, $H_2$, $CO_2$ and $CH_4$ increased with temperature, indicating that transport was in the activated transport regime. At 150° C., the $H_2$ permeance increased to $3.3\times10^{-8}$-$4.1\times10^{-7}$ mol m$^2$ s$^{-1}$ Pa$^{-1}$ (100-1220 GPU), with $H_2/CH_4$, and $H_2/CO_2$ selectivities increasing to 7.1-23.5 and 3.6-12.2, respectively (FIGS. 4a-i). This $H_2/CH_4$ separation performance from single-layer graphene with a miniscule 0.025% porosity is approaching the upper bound measured for polymeric membranes (Robeson, 2008, supra) (assuming 1-µm-thick selective skin layer of polymer membrane). Using an absorbed phase transport model described in Drahushuk et al., 2012, *Langmuir*, 28, 16671-16678 and Yuan et al. 2017, *ACS Nano* 11, 7974-7987, it could be extracted an average activation energies for gases from the temperature-dependent gas flux.

$$\text{Flux} = C_o A_{act} A_{sur} \exp\left(-\frac{(E_{act} + \Delta E_{sur})}{RT}\right)(f(P_A) - f(P_R)) \quad \text{(Equation 1)}$$

$$\text{where } f(P_x) = \frac{P_x}{1 + A_{sur}\exp\left(\frac{-\Delta E_{sur}}{RT}\right)P_x}$$

Here, $C_O$ is the pore-density, $E_{act}$ and $\Delta E_{sur}$ are the activation energies for pore translocation and gas-graphene interaction potential, respectively. $A_{act}$ and $A_{sur}$ are the corresponding pre-exponential factors. T is the temperature, and $P_A$ and $P_R$ are the gas partial pressures on the feed and permeate sides, respectively. The average $E_{act}$ (all 8 membranes) for He, $H_2$, $CO_2$ and $CH_4$ were 16.7±3.2, 20.2±2.7, 31.3±2.8, and 25.8±4.8 kJ/mol, respectively, increasing as a function of kinetic diameter. The activation energy for $H_2$ is similar to that from hydrogen-functionalized pore-10 reported by Jiang et al., 2009, *Nano Lett.*, 9, 4019-402 (0.22 eV), indicating that the average pore in this study is made of missing 10 carbon atoms, consistent with previous STM findings (Agrawal et al., 2017, supra). A slightly smaller $E_{act}$ for $CH_4$ in comparison to $CO_2$ can be explained by the fact that $CH_4$ translocation takes place from a smaller number of pores (average $C_o A_{act} A_{sur}$ for He, $H_2$, $CO_2$ and $CH_4$ were $1.5\times10^{-5}$, $2.6\times10^{-5}$, $3.8\times10^{-6}$ and $1.3\times10^{-6}$, respectively), assuming $A_{act} A_{sur}$ do not change significantly for $CO_2$ and $CH_4$. High resolution transmission electron microscopy (HRTEM) demonstrated that sub-nanometer pores were indeed present in the CVD graphene. Statistical analysis of these pores suggested the pore-density was around $2.8\times10^{11}$ cm$^{-2}$, which is within the same order of magnitude than that predicted from the carbon amorphization trajectory. Overall, the observation of the activated transport and visualization of sub-nanometer pores indicate that a higher H$_2$ permeance can be obtained at elevated temperature (250-300° C.), especially in a non-oxidizing atmosphere.

Separation of gas mixture is key to understand the effect of competitive adsorption and diffusion through nanoporous graphene. However, till date, report of gas mixture separation through single-layer graphene membrane has remained elusive. The transport of species i from n-component gas mixture across graphene nanopores can be modeled by $$Flux_i = C_o A_{act,i} A_{sur,i} \exp\left(-\frac{(E_{act,i} + \Delta E_{sur,i})}{RT}\right)(g(P_{i,A}) - g(P_{i,R})) \quad \text{(Equation 2)}$$

where $g(P_x) = \dfrac{P_x}{1 + \sum_{1}^{n} A_{sur} \exp\left(\frac{-\Delta E_{sur}}{RT}\right) P_x}$ Membranes of the invention comprising of a large-area-graphene membrane allowed measuring the flux of He, H$_2$, CO$_2$ and CH$_4$ from an equimolar gas mixture. Interestingly, the overall performance trends (permeance and separation factors) for the mixture feed improved in comparison to those observed in the case of the single component feeds (FIG. 4f-i). Notably, although the H$_2$ permeance and the corresponding activation energy for membrane M2 were similar with the single-component to the mixture case (E$_{act}$ of M2 mixture for He, H$_2$, CO$_2$ and CH$_4$ were 20.4, 19.9, 34.9, 28.8 kJ/mol). The H$_2$/CH$_4$ selectivity improved from 5.7 (single-component) to 10.8 (mixture) at 25° C. and from 11.2 (single-component) to 12.2 (mixture) at 150° C. Similarly, the H$_2$ permeance also did not change for M3 but the H$_2$/CH$_4$ selectivity increased from 14.2 (single-component) to 18.0 (mixture). For other membranes (M1, M4, M5 and M6), the H$_2$ permeance and the H$_2$/CH$_4$ selectivity did not change in the mixture case in comparison to the single-component case. These results underscore a unique feature of a single-layer graphene membrane of the invention for size-sieving of light gases, where competitive adsorption (CH$_4$ in contrast to H$_2$) does not reduce separation selectivity at least at the moderate feed pressure (1-7 bars). This is advantageous for separation of H$_2$ from CH$_4$ even at a higher concentrations of CH$_4$.

Figure 5:
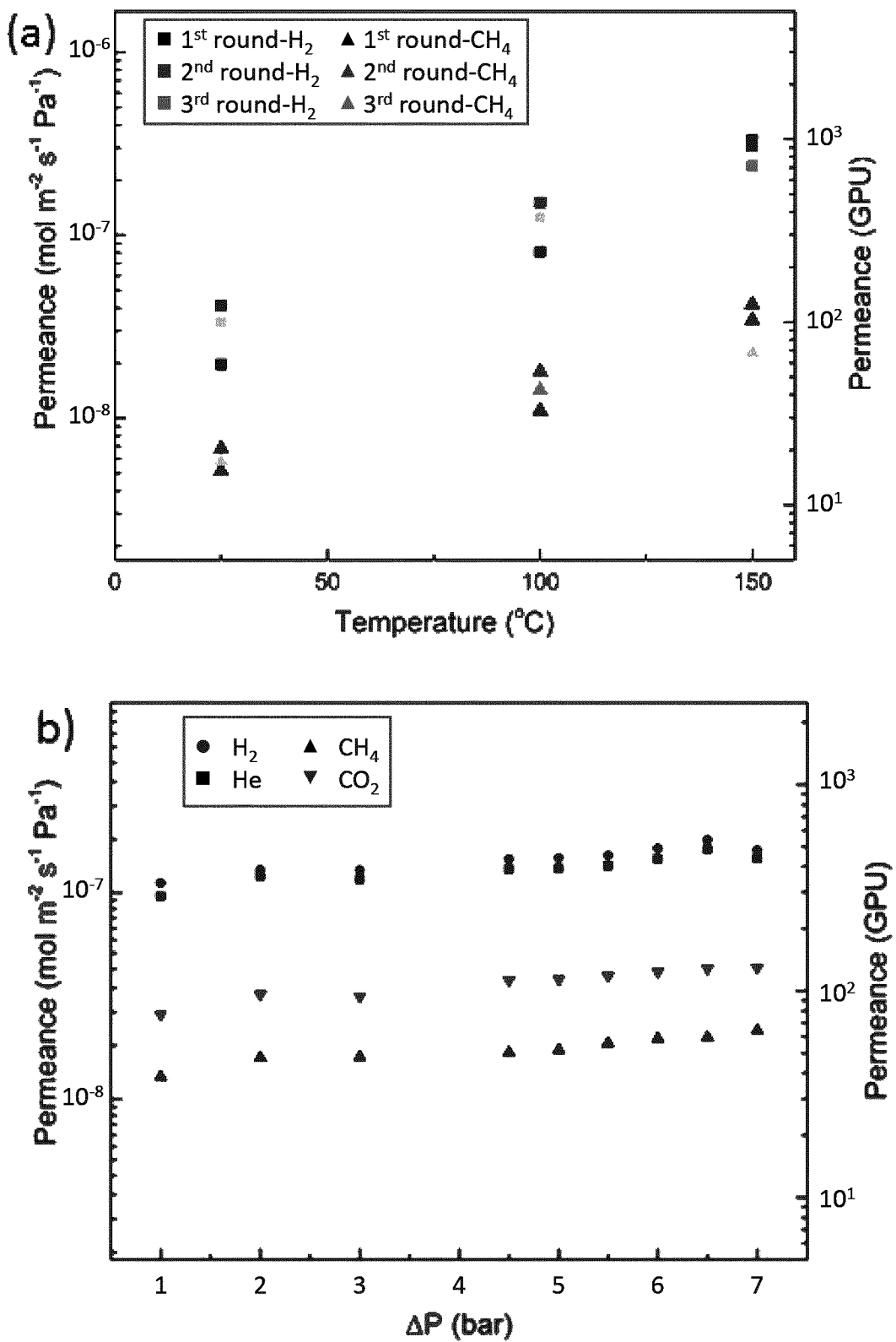
FIG. 5 reports stability test of intrinsic defects of the graphene membrane of the invention as described in Example 3. a) $H_2$ and $CH_4$ permeance with three consecutive temperature cycles. b) Gas permeance of different gases as function of testing pressure (1-7 bars) at 100° C. c) Separation factors between $H_2$ and $CH_4$ as function of testing pressure (1-7 bars) at 100° C.
Figure 5:
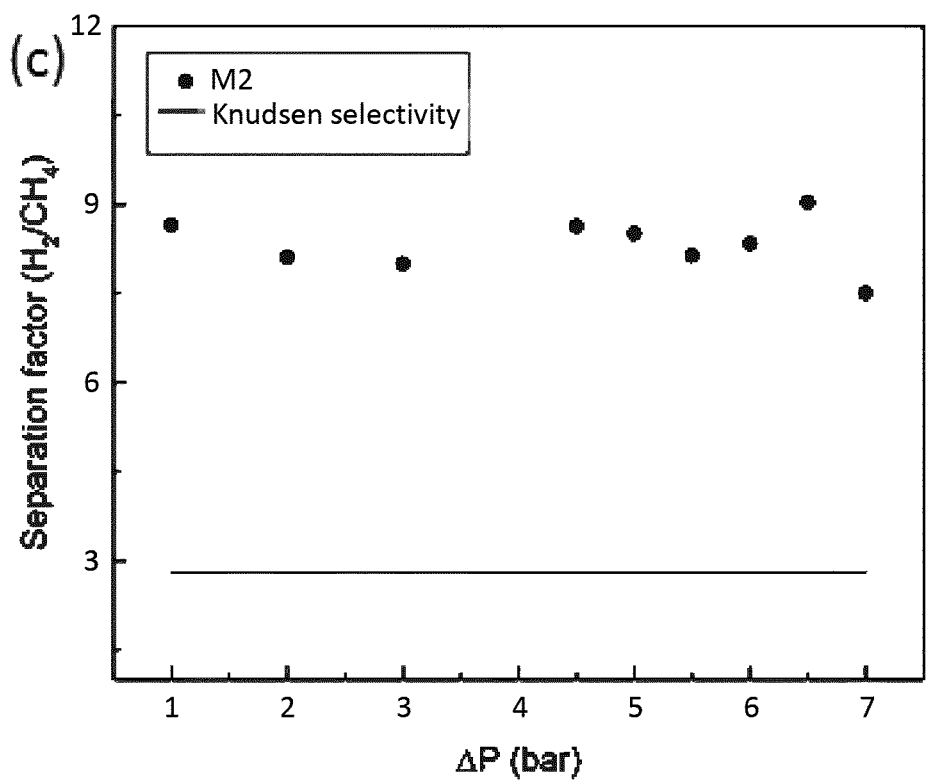

Further, the graphene membranes of the invention showed exceptional thermal stability. In general, all membranes were stable at least up to 150° C. For instance, the performance of membrane M2, tested under three consecutive temperature cycles from 25° C. to 150° C., did not change significantly (FIG. 5a). From cycle 1 to cycle 3, at 150° C., the H$_2$ permeance decreased marginally (3.3×10$^{-8}$ to 2.3×10$^{-8}$ mol m$^{-2}$ s$^{-1}$ Pa$^{-1}$), while the H$_2$/CH$_4$ selectivity increased marginally (8.3 to 10.5). Moreover, the graphene membranes were also stable at least up to 8 bars of mixture feed at 100° C. (FIGS. 5b & c). H$_2$ permeance and H$_2$/CH$_4$ separation factor did not change significantly, when the mixture feed pressure was increased from 2 to 8 bars with permeate side pressure maintained at 1 bar (FIG. 5b-c).

Altogether, those data support that the method of the invention allows achieving a scalable support assisted transfer method to fabricate crack- and tear-free, thermally stable, large-area (about 1 mm$^2$-sized) suspended single-layer graphene membranes. The so-obtained carbon substrate supported graphene membranes with a very low porosity of about 0.025% unexpectedly displayed attractive gas sieving performance which, unexpectedly was not hampered by the supporting carbon coating (H$_2$ permeance up to 4.1×10$^{-7}$ mol m$^{-2}$ s$^{-1}$ Pa$^{-1}$ and H$_2$/CH$_4$ selectivity up to 23).

The following Table describes the permeance of the coating film alone.

TABLE S1

| Gas permeance through the carbon film | |
|---|---|
| Gas | Permeance (mol m$^{-2}$ s$^{-1}$ Pa$^{-1}$) |
| H$_2$ | 1.9 × 10$^{-3}$ |
| He | 1.1 × 10$^{-3}$ |
| CH$_4$ | 7.8 × 10$^{-4}$ |
| N$_2$ | 6.0 × 10$^{-4}$ |
| CO$_2$ | 4.4 × 10$^{-4}$ |

The obtained H$_2$ permeance and selectivities were approaching the performance of 1-µm-thick state-of-the-art polymer membranes. Further advantageously, the performance of the carbon supported graphene membranes of the invention were stable during multiple cycles of heating and cooling, and at least up to moderate transmembrane pressure differences (7 bars). The use of gas mixture feed did not reduce either the H$_2$ permeance or the H$_2$/CH$_4$ separation selectivity.

Example 4: Ozone Treatment for Further Increasing Membrane Performance

As reported in Example 3, the porosity of the graphene membranes of the invention leading to H$_2$ permeance close to 3.3×10$^{-8}$-4.1×10$^{-7}$ mol m$^{-2}$ s$^{-1}$ Pa$^{-1}$ at 150° C. was only 0.025%. It has been unexpectedly found that exposure of graphene membranes to ozone can be used for further tuning gas separation performance of graphene membranes as supported below.

Ozone treatment effect on the carbon substrate supported graphene membranes of the invention was investigated at various temperature (25° C. to 100° C.) and time (1 min to 7 min) and carried out in-situ in the permeation setup (FIG. 3) wherein O$_3$ was introduced from the permeate side to prevent oxidation of the mechanically-reinforcing carbon supporting film. Gas transport before and after O$_3$ treatment was compared immediately after treatment and as a function of temperature. The evolution of graphene as a function of ozone exposure was studied by micro-Raman spectroscopy (FIG. 6a-b) and X-ray photoelectron spectroscopy (XPS, FIG. 5c-d) as detailed below.

Raman characterization was carried on the standalone graphene membrane (without the carbon film) of the invention transferred onto SiO$_2$/Si wafer by the wet-transfer method (Robeson, 2008, supra). Single-point data collection and mapping were performed using Renishaw micro-Raman spectroscope (532 nm, 2.33 eV, 100×objective). Analysis of the Raman data was carried out using MATLAB. For calculation of the D and the G peak height, the background was subtracted from the Raman data using the least-squares curve fitting tool (lsqnonlin).

X-ray photoelectron spectroscopy (XPS) analysis was conducted on the standalone graphene membrane (without the carbon film) of an embodiment of the invention still on the Cu foil using a Mg Kα X-ray source (1253.6 eV) and Phoibos 100 (SPECS) hemispherical electron analyser with multichanneltron detector. The XPS spectra were recorded in fixed analyser transmission (FAT) mode using pass energies of 90 eV for the survey and 20 eV for the narrow scans. The samples did not show electrostatic charging thus the binding energies are presented without any correction (Bonding energy of C—C: 284.4 eV; C—O: 285.7 eV; C=O: 286.8 eV; O—C=O: 288.5 eV). Because carbonyl group (C=O) is part of (O—C=O), O—C=O was counted in C=O in the summary of functional group. The XPS spectra were processed with CasaXPS, with background subtraction by the Shirley method.

The relative intensity of D peak with respect to the G peak, which marks the extent of disorder in graphene, increased ($I_D/I_G$ increased from 0.07 to 4.0), while the 2D peak decreased in intensity with the increasing reaction time and temperature, indicating that the $sp^3$-hybridized sites in graphene increased after ozone treatment (Yuan et al., 2013, *ACS Nano*, 7, 4233-4241). Bonding-energy distribution of ozone-functionalized graphene showed that C—O and C=O were the major functional groups on graphene post ozone-functionalization. Interestingly, the number density of C=O groups was higher than that of the C—O groups, even in the case of mild functionalization (25° C. for 2 minutes). The number density of functional groups increased with the reaction temperature and time (FIG. 6c-d) in agreement with the Raman spectroscopy results. At 100° C., the total coverage of C—O and C=O groups was as high as 35, 56, and 65%, for exposure times of 2, 5 and 7 minutes, respectively.

Interestingly, post ozone treatment, the separation performance of all the graphene membranes improved marked by either an increase in the $H_2$ permeance or an increase in the $H_2/CH_4$ selectivity or improvement in permeance and selectivity:

When $O_3$ treatment was carried out at 25° C. for 2 minutes, the $H_2$ permeance decreased from $1.9 \times 10^{-7}$ to $1.2 \times 10^{-7}$ mol m$^{-2}$ s$^{-1}$ Pa$^{-1}$, while the $H_2/CH_4$ and the $H_2/CO_2$ selectivities increased from 10.0 to 15.0 and 5.1 to 6.4, respectively at 150° C. (M2, FIG. 6a-b), indicating pore-shrinkage. Interestingly, both $E_{act-app}$ (defined as $E_{act}$+ $\Delta E_{sur}$) and $C_o A_{act} A_{sur}$ decreased after pore functionalization with $O_3$ treatment. While the changes in $E_{act-app}$ are complex to interpret because of relative changes in $E_{act}$ (higher activation energy due to pore-shrinking) and $\Delta E_{dsur}$ (increase in binding energy with functionalized pores), 20-fold decrease in $C_o A_{act} A_{sur}$ for $CH_4$ ($5.7 \times 10^{-7}$ to $2.8 \times 10^{-8}$) clearly indicates less number of pores available to translocation of $CH_4$ post-ozone treatment. Without being bound to any theory, it could be explained by the functionalized pore-edges shrinking in size, blocking bigger gas molecular passing through functionalized pores, resulting in a higher gas selectivity.

Figure 6:
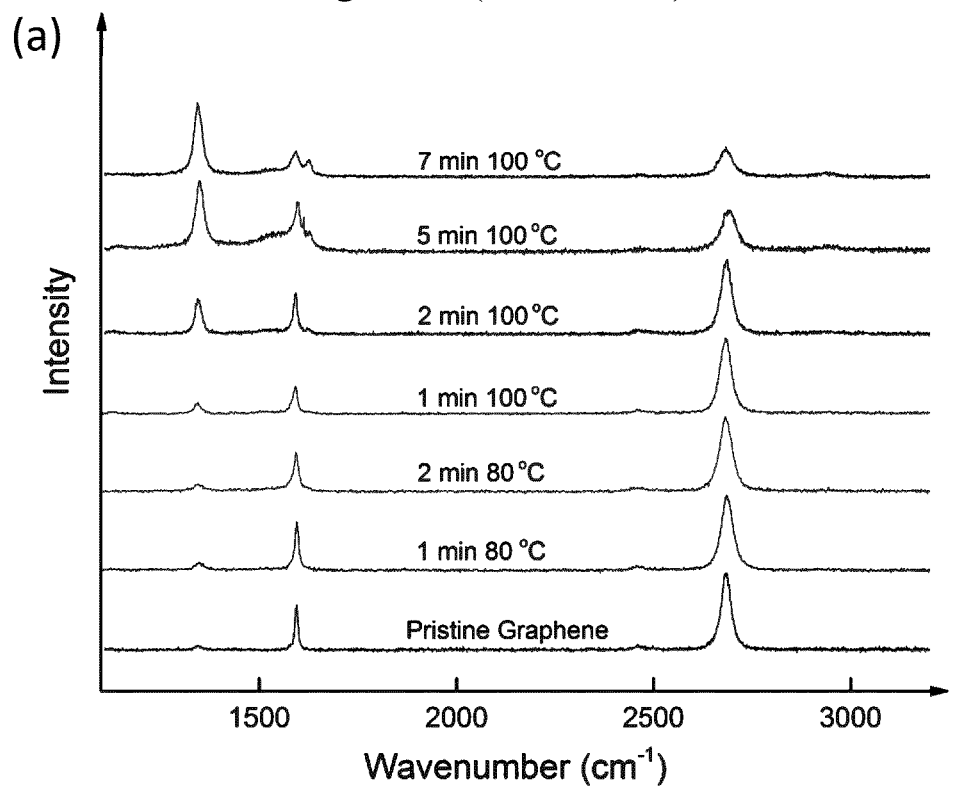
FIG. 6 reports characterization of ozone treated graphene membrane according to an embodiment of the invention, as described in Example 4. a) Raman spectra of graphene membranes $O_3$-treated under different conditions. b) Histogram of $I_D/I_G$ values of $O_3$-treated graphene membranes with different treatment. c) C—O bond contents of $O_3$-treated graphene membranes treated with different reaction temperature and reaction time. d) C=O bond contents of $O_3$-treated graphene membranes treated with different reaction temperature and reaction time.
Figure 6:
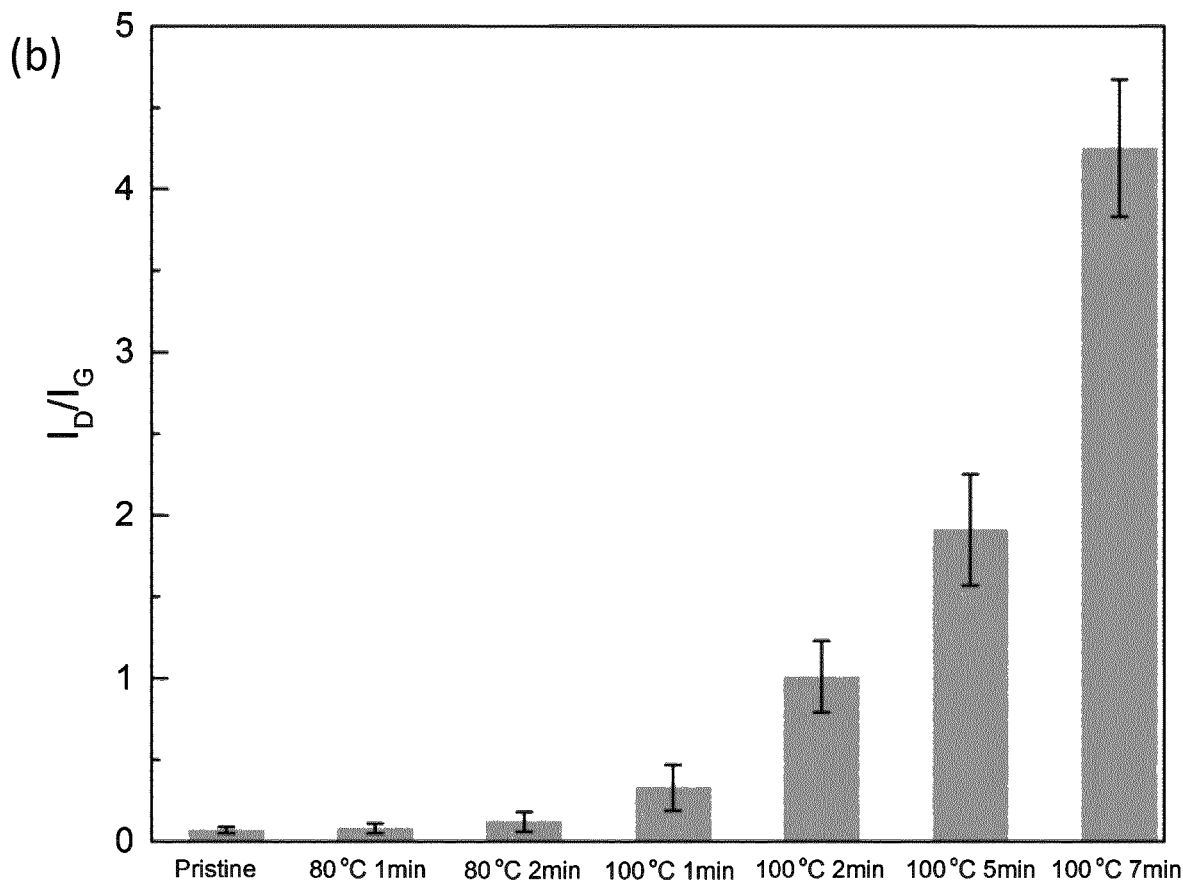
Figure 6:
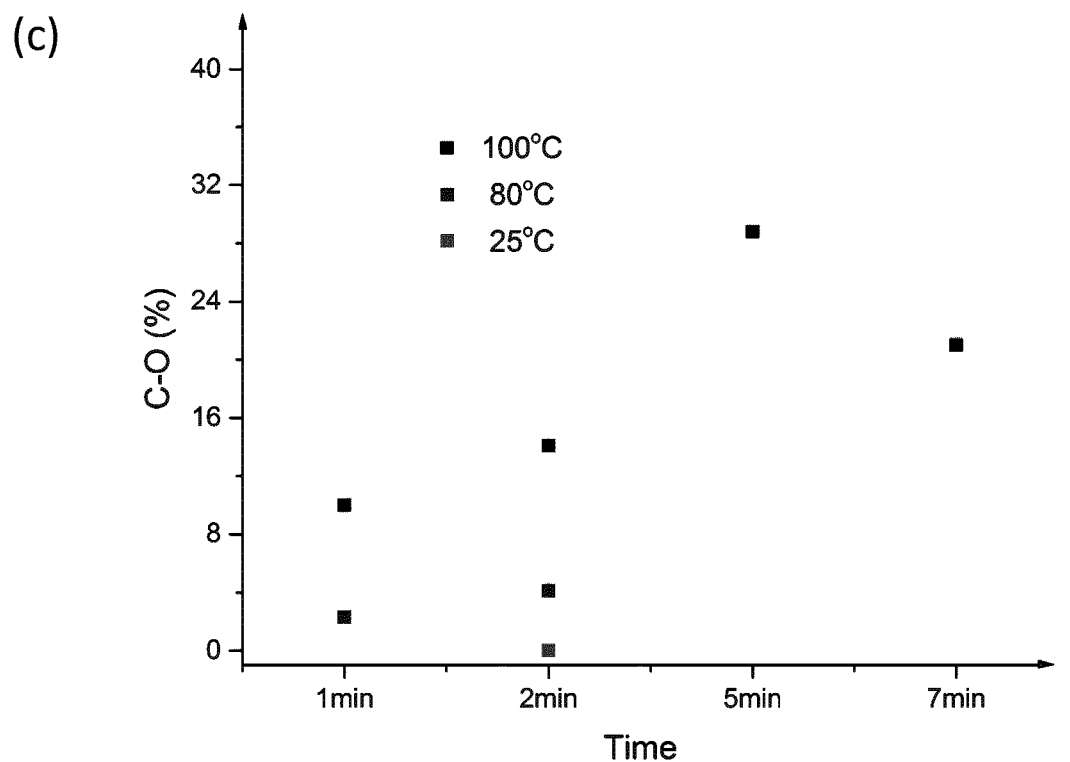
Figure 6:
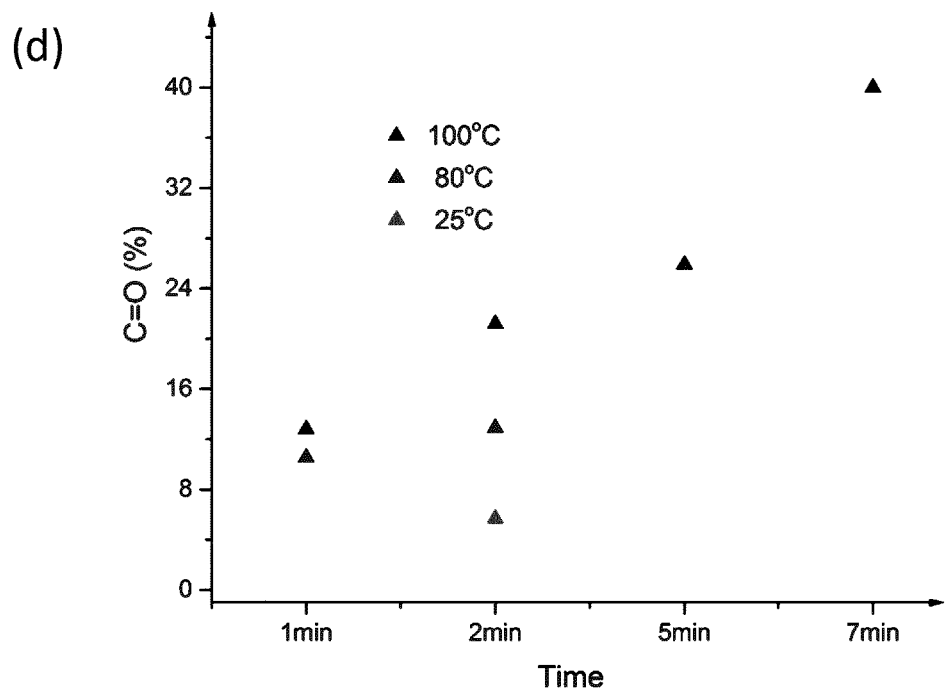
Figure 7:
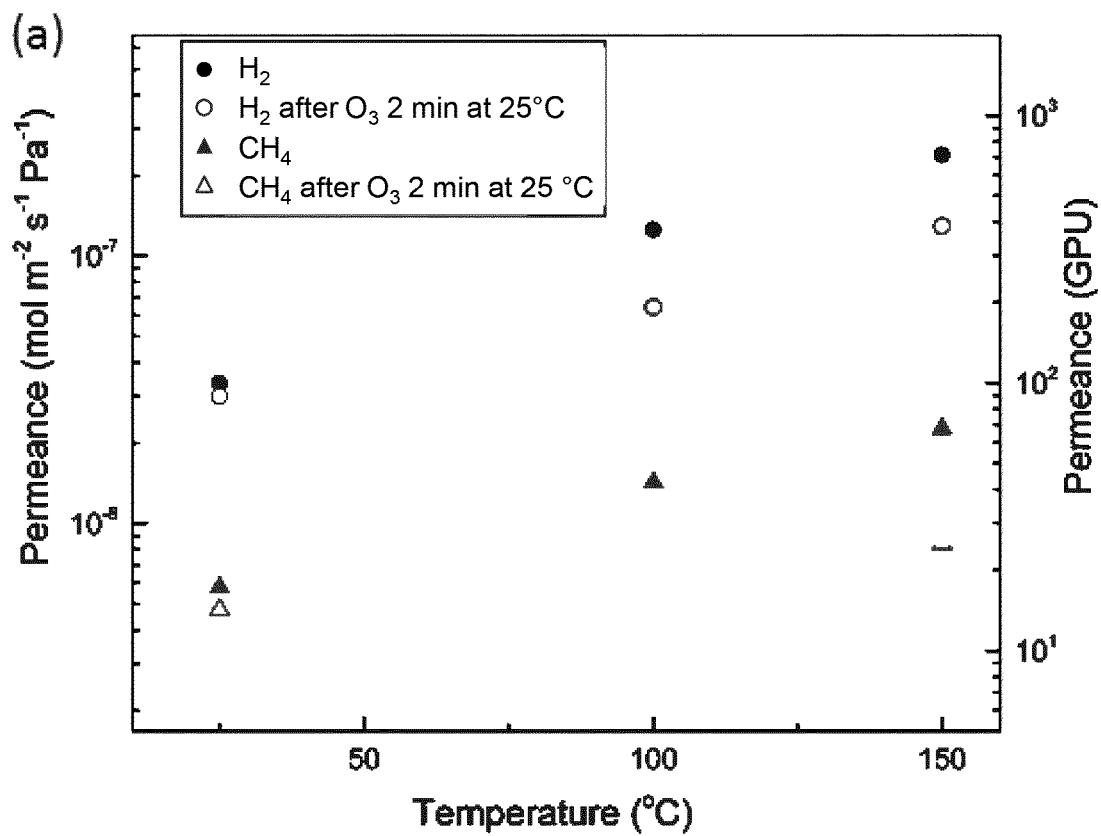
FIG. 7 reports gas separation performance results of several ozone treated graphene membranes according to the invention as described in Example 4. Briefly, graphene films where intrinsic defects from the CVD growth acted as transport pathway were treated with ozone at temperature ranging from 25–100° C. for durations of 1-10 minutes, which led to improvement in the gas separation performance of the membranes. The improvement in the performance was dependent on the intrinsic defects (mean pore-size, pore-density) and the ozone treatment temperature and the treatment time. a-b) M2 treated 2 min $O_3$ at 25° C., a) permeance of $H_2$ and $CH_4$, b) $H_2/CH_4$ and $H_2/CO_2$ selectivities. c-d) M8 treated 2 min $O_3$ at 100° C., c) permeance of $H_2$ and $CH_4$, d) $H_2/CH_4$ and $H_2/CO_2$ selectivities. e-f) M6 treated 1 min $O_3$ at 80° C., e) permeance of $H_2$ and $CH_4$, f) $H_2/CH_4$ and $H_2/CO_2$ selectivities. g) Trajectory of gas separation performance after different ozone treatment. (Data of M8 were taken at 200° C. and other data are measured at 150° C., lighter markers are gas performance of pristine graphene membranes, while darker markers are gas performance of functionalized graphene membranes from corresponding membranes).
Figure 7:
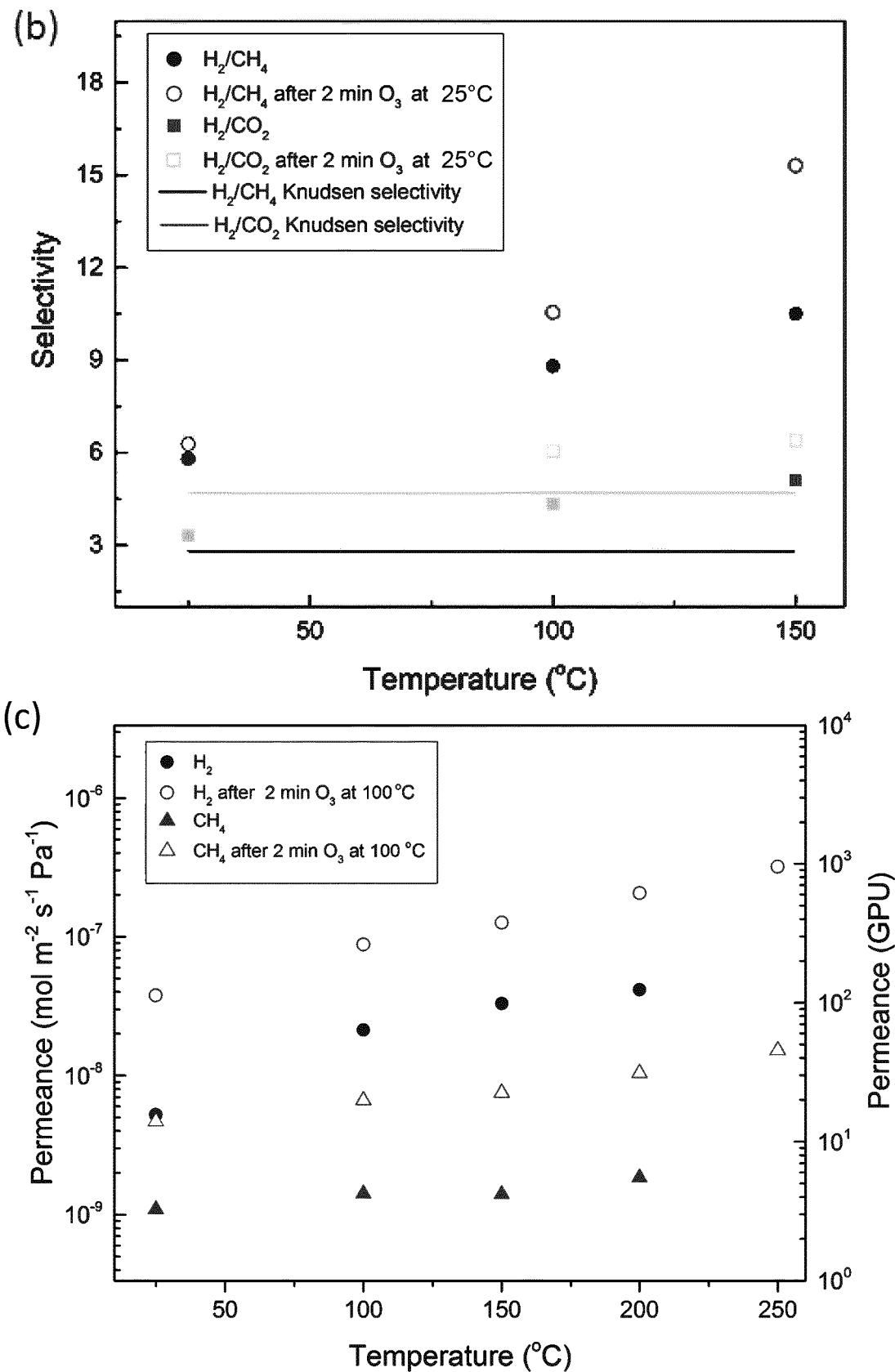
Figure 7:
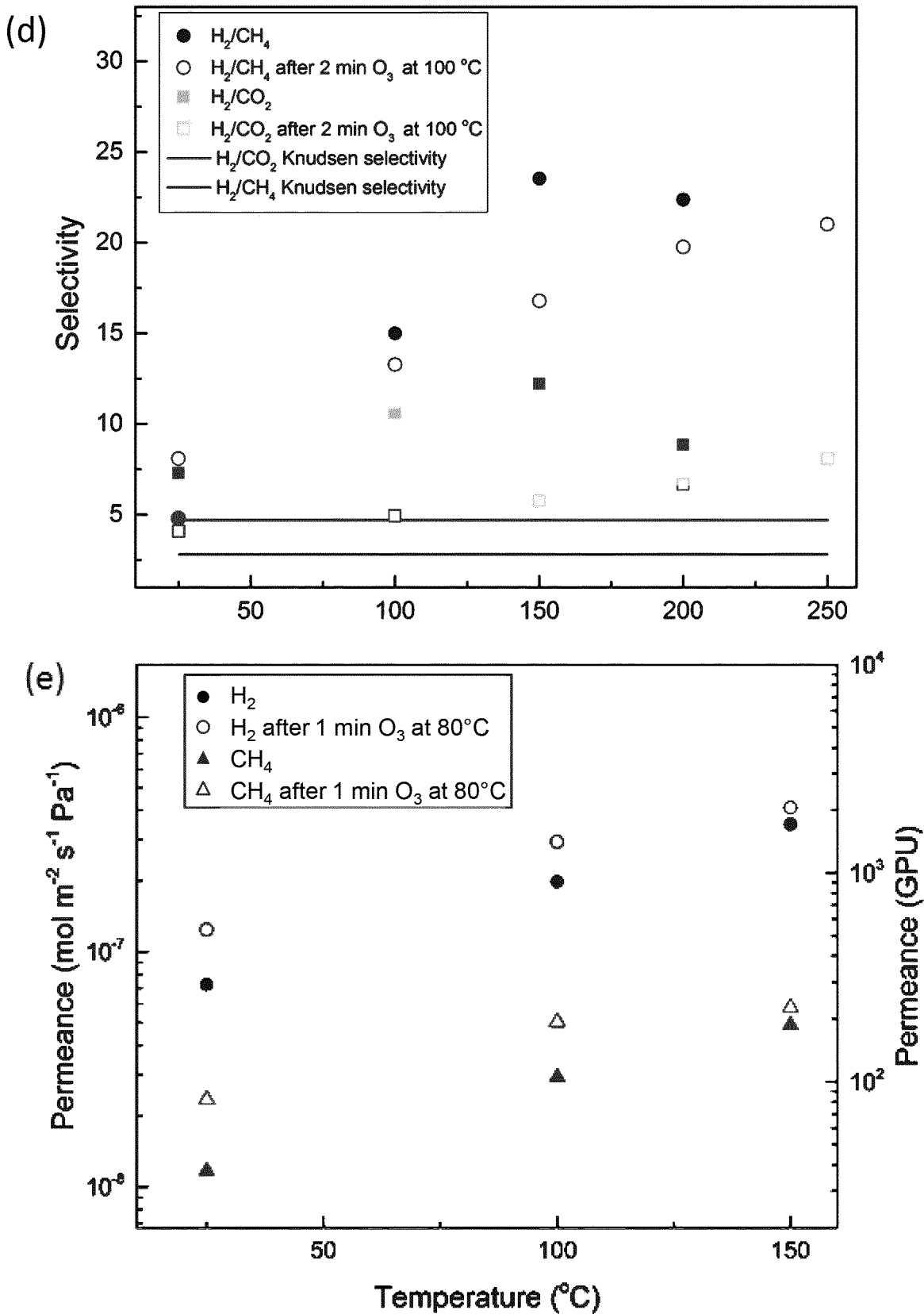
Figure 7:
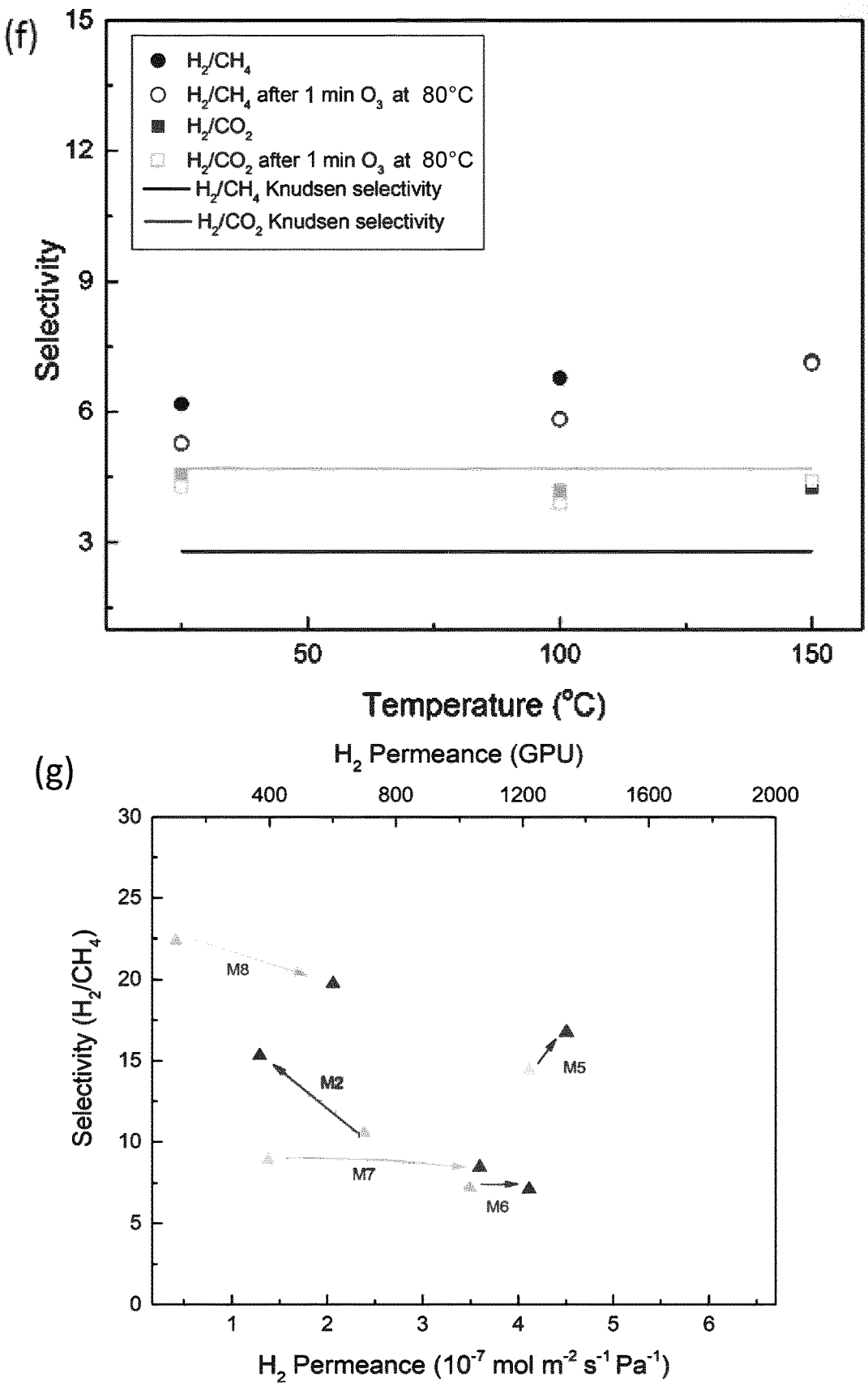

In contrast, ozone treatment at 100° C. led to an increase in gas permeance by 3-fold, while the gas selectivity remained similar to that obtained from intrinsic defects (FIG. 6c-d). Here, $E_{act-app}$ did not change significantly post-functionalization, while $C_o A_{act} A_{sur}$ for gases increased by an order magnitude indicating an increase in the pore-density. Given that the high-temperature treatment leads to a higher coverage of the C—O and C=O groups, it is highly likely that these functional groups aggregate, releasing carbon from the graphene lattice in the gas phase as CO and/or $CO_2$ and in the process, form new pores. The functionalization based performance improvements relies on the PSD of intrinsic defects in graphene. For example, graphene membrane displaying superior separation performance (narrower PSD) from the intrinsic defects also displayed a superior separation performance after ozone treatment at 80° C.

A separation performance trajectory was built by comparing the separation selectivity and hydrogen permeance before and after the ozone treatment (FIG. 6g). The overall trajectory trends clearly show that gas separation performance of graphene membranes of the invention can be tuned by the ozone treatment.

A higher gas permeance (3-fold increase) can be achieved by generating new nanopore by ozone treatment at 80-100° C. (FIG. 6c-f) and HRTEM images of the functionalized graphene provided evidence that a higher number-density of sub-nanometer pores exist in graphene after ozone-treatment at 80° C. for 2 min (pore density increased from $2.8 \times 10^{11}$ to $4.2 \times 10^{11}$ cm$^{-2}$), while the selectivity could be maintained. In the case of membrane M5, an increase in separation selectivity as well as permeance was obtained after ozone treatment at 80° C. for 1 min. We hypothesize that in the case of membrane M5, the new pores had a narrower PSD.

A higher selectivity can be obtained when ozone treatment is carried out at room temperature (e.g. 25° C.), while decreasing the permeance.

Therefore, since both permeance and selectivity determine a membrane performance, these results support that gas separation performance of gas selective filters with graphene membranes according to embodiments of the invention can be further improved by ozone-functionalization, depending on the feed specifications and purity and recovery requirements. The post-synthetic treatment according to the invention allowed improving $H_2$ permeance (up to 300%) as well as $H_2/CH_4$ selectivities (up to 150%).

Therefore, a controlled temperature-dependent functionalization of graphene lattice with ozone-derived epoxy and carbonyl groups can be used to open up gas-selective pores in the CVD derived graphene, or constrict the existing pores, which will be useful for gas filtration performance tuning of gas selective filters with graphene membranes according to the invention.

The invention claimed is:

1. A gas selective separation filter comprising a nanoporous graphene membrane having a thickness of about 0.34 to 2 nm and a porosity greater than 0.001%, a porous carbon substrate on which the graphene membrane is mounted, the porous carbon substrate having a porosity in a range of 5% to 90%, and a porous support structure on which the graphene membrane and porous carbon substrate are mechanically supported.

2. The gas selective separation filter according to claim 1, wherein pores of the nanoporous graphene membrane have a mean size between about 0.2 nm and about 0.5 nm.

3. The gas selective separation filter according to claim 1, wherein the porous carbon substrate has a porosity in a range of 10% to 80% and comprises pores having a mean size in a range of about 10 to 1000 nm.

4. The gas selective separation filter according to claim 1, wherein the porous support structure has a porosity in a range of 2% to 60% formed by pores having a mean size in a range of 0.01 μm to 100 μm and a thickness in a range of 10 μm to 10000 μm.

5. A method for the preparation of a gas selective separation filter comprising the steps of:
   a) providing a graphene membrane on a sacrificial support layer;
   b) coating said graphene membrane with an organic precursor of a porous carbon substrate;
   c) subjecting the organic precursor to a pyrolysis transforming the organic precursor into said porous carbon substrate on the graphene membrane, wherein the porous carbon substrate has a porosity between 5% and 90%;

d) mounting the combined porous carbon substrate and graphene membrane on a macroporous support structure; and e) removing, before or after step d), at least portions of the sacrificial support layer.

6. The method according to claim 5, wherein in step e), removing at least portions of the sacrificial support layer comprises etching said portions of the sacrificial support layer.

7. The method according to claim 6, wherein the etching is performed prior to step d) to obtain a free-standing combined porous carbon substrate and graphene membrane suspended in the etchant solution.

8. The method according to claim 5, wherein in step e) the combined porous carbon substrate and graphene membrane is mounted on said macroporous support structure by a wet transfer process in a liquid bath.

9. The method according to claim 5, wherein in step b) said organic precursor is in a solution and the solution is dried until a film of the organic precursor is formed at the surface of the graphene membrane.

10. The method according to claim 9, wherein the solution is a solution of turanose and block-copolymer polystyrene-co-poly(4-vinylpyridine) (PS-P4VP) dissolved in N,N-dimethylformamide.

11. The method according to claim 5, wherein the organic precursor is an amphipathic block copolymer of polyvinylpyridine and polystyrene monomers.

12. The method according to claim 11, wherein the block-copolymer is polystyrene-co-poly(4-vinylpyridine) (PS-P4VP).

13. The method according to claim 5, wherein the organic precursor of a porous structure is an amphipathic block copolymer.

14. The method according to claim 5, wherein in step c) pyrolysis is conducted during about 0.25 to about 1.5 hours, at a temperature in a range of 400° C. to 1000° C.

15. The method according to claim 5, wherein in step c) pyrolysis is conducted under a $H_2$/Ar flow.

16. The method according to claim 5, further comprising a treatment of the graphene membrane with ozone under inert atmosphere for about 1 ms to about 1 month or for about 30 s to about 60 minutes.

17. The method according to claim 5, further comprising a treatment of the graphene membrane with ozone at a temperature between about 25° C. and 300° C.

18. The method according to claim 17, wherein the temperature is between 25° C. and about 100° C.

19. A method of separating components of a gas comprising applying a gas to the gas selective separation filter according to claim 1 and separating the components of the gas.

20. The method according to claim 19, wherein the method separates $H_2$ or $CH_4$ from $CO_2$.

* * * * *